United States Patent
Ito et al.

(10) Patent No.: US 7,814,037 B2
(45) Date of Patent: Oct. 12, 2010

(54) INFORMATION PROCESSING APPARATUS AND METHOD, AND PROGRAM FOR TEACHING AN ACTION TO A DEVICE IN A TIME-SERIES PATTERN

(75) Inventors: Masato Ito, Tokyo (JP); Yukiko Yoshiike, Tokyo (JP); Kuniaki Noda, Tokyo (JP); Jun Tani, Kanagawa (JP)

(73) Assignees: Sony Corporation, Tokyo (JP); Riken, Saitama (JP)

( * ) Notice: Subject to any disclaimer, the term of this patent is extended or adjusted under 35 U.S.C. 154(b) by 324 days.

(21) Appl. No.: 11/397,148

(22) Filed: Apr. 4, 2006

(65) Prior Publication Data

US 2007/0239641 A1     Oct. 11, 2007

(30) Foreign Application Priority Data

Apr. 5, 2005     (JP)     ............................. 2005-109249

(51) Int. Cl.
    *G05B 13/02*     (2006.01)
(52) U.S. Cl. ......................................................... 706/23
(58) Field of Classification Search .................... 706/23
    See application file for complete search history.

(56) References Cited

U.S. PATENT DOCUMENTS 5,255,096 A * 10/1993 Boyle ........................... 348/95

FOREIGN PATENT DOCUMENTS

JP     02160487 A     *     6/1990

OTHER PUBLICATIONS

Tani, J. and Ito, M. "Self-organization of behavioral primitives as multiple attractor dynamics: A robot experiment" IEEE Trans. on Systems, Man, and Cybernetics Part A: Systems and Humans, vol. 33, No. 4, pp. 481-488, 2003.*
Atkeson, C and Schaal, S. "Robot Learning From Demonstration", ICML 97.*
Tani, J. and Ito, M. "Self-organization of behavioral primitives as multiple attractor dynamics: A robot experiment" IEEE Trans. on SMC Part A: Systems and Humans, vol. 33, No. 4, pp. 481-488, 2003.*

* cited by examiner

*Primary Examiner*—Donald Sparks
*Assistant Examiner*—Li-Wu Chang
(74) *Attorney, Agent, or Firm*—Frommer Lawrence & Haug LLP; William S. Frommer; Thomas F. Presson

(57) ABSTRACT

An information processing apparatus including a learning unit that learns a predetermined time-series pattern. An output unit outputs a time-series pattern corresponding to the result of learning by the learning unit. An adjusting unit supplied with a time-series pattern obtained from an action by an action unit on the basis of a time-series pattern supplied from the output unit and external teaching for the action adjusts a time-series pattern supplied from the output unit correspondingly to the input time-series pattern. The learning unit learns the time-series pattern supplied from the output unit and adjusted by the adjusting unit.

10 Claims, 21 Drawing Sheets

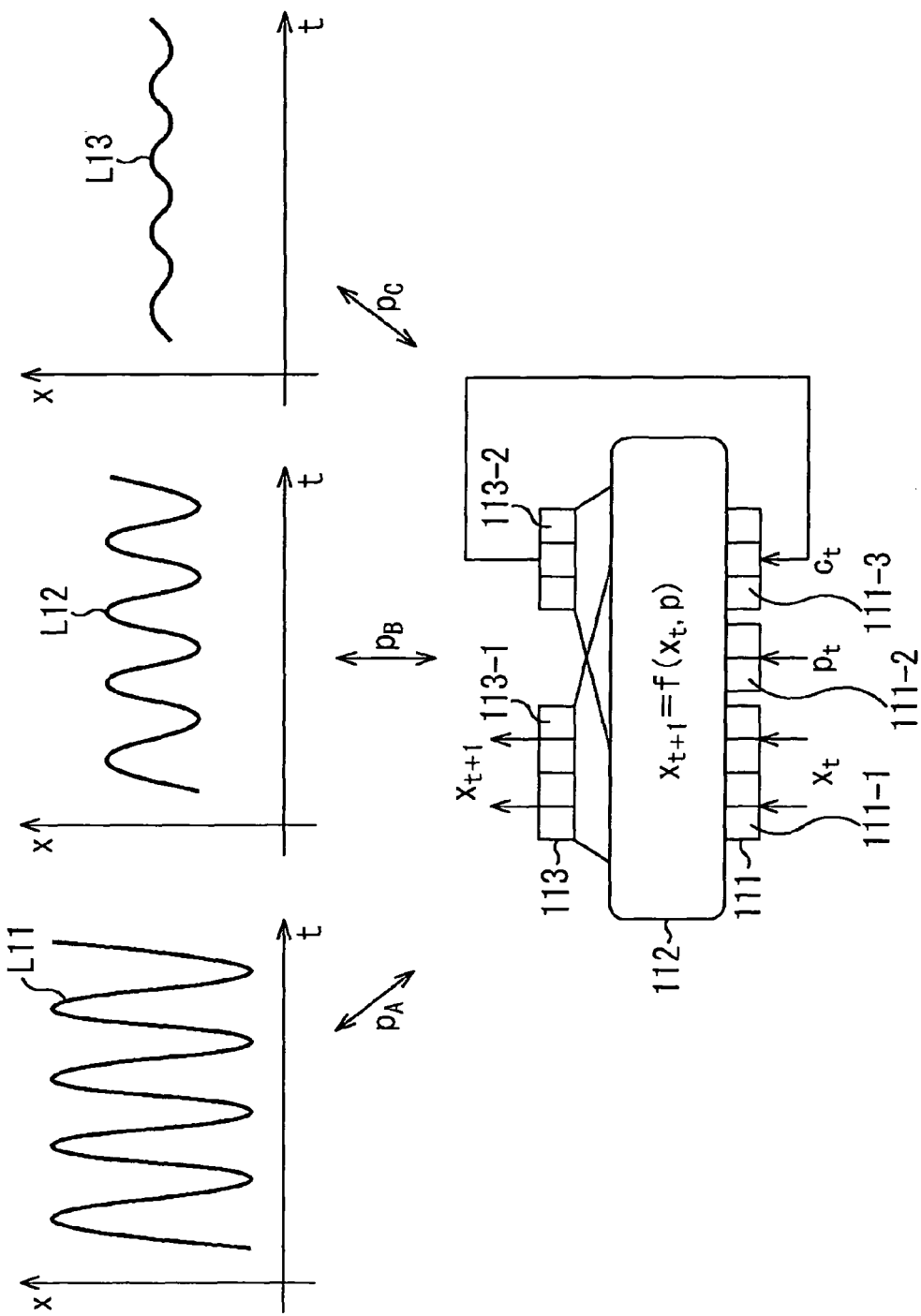

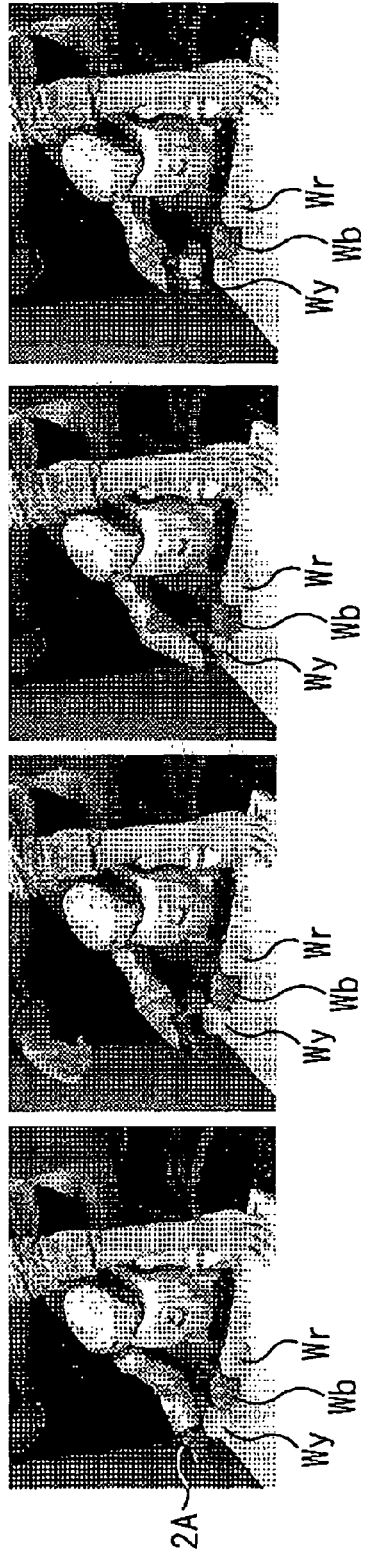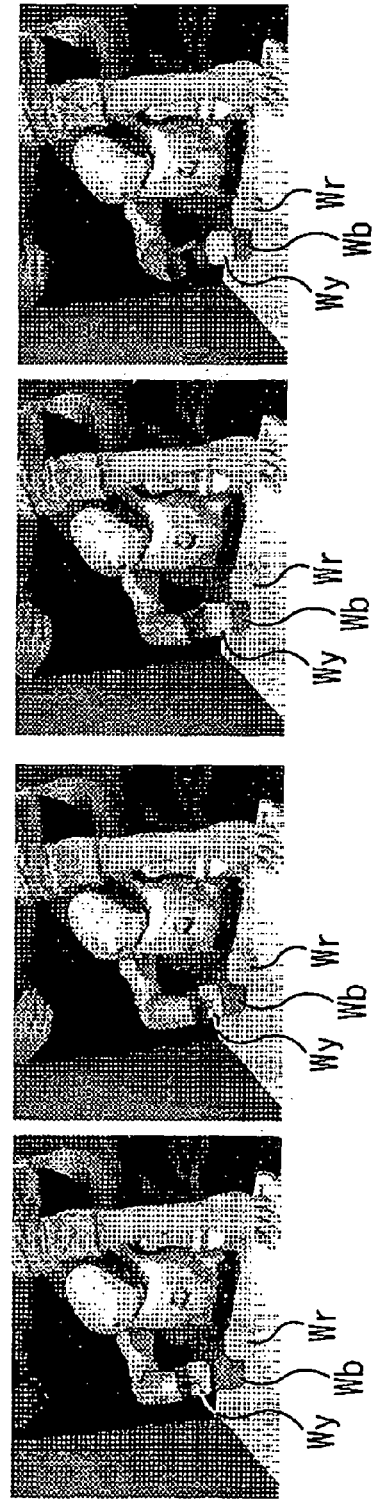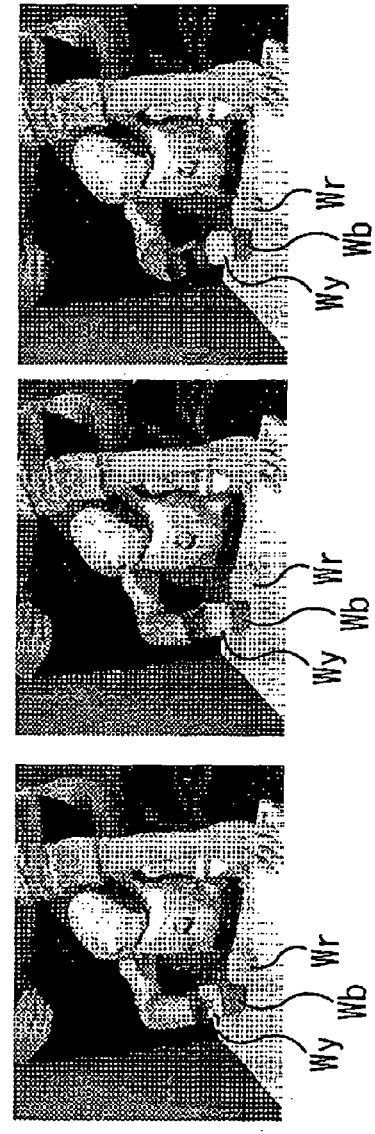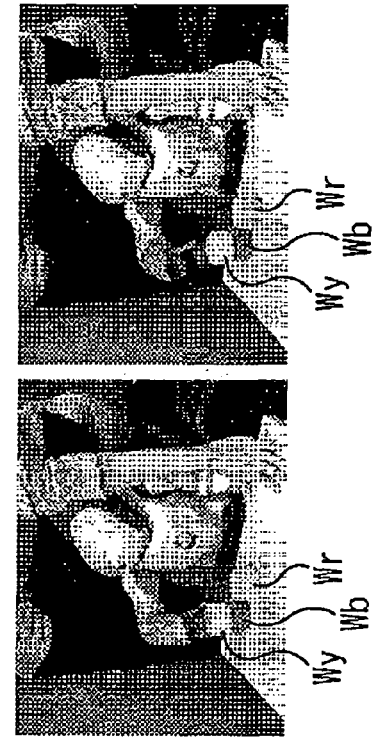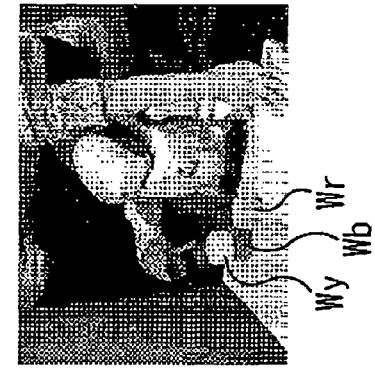

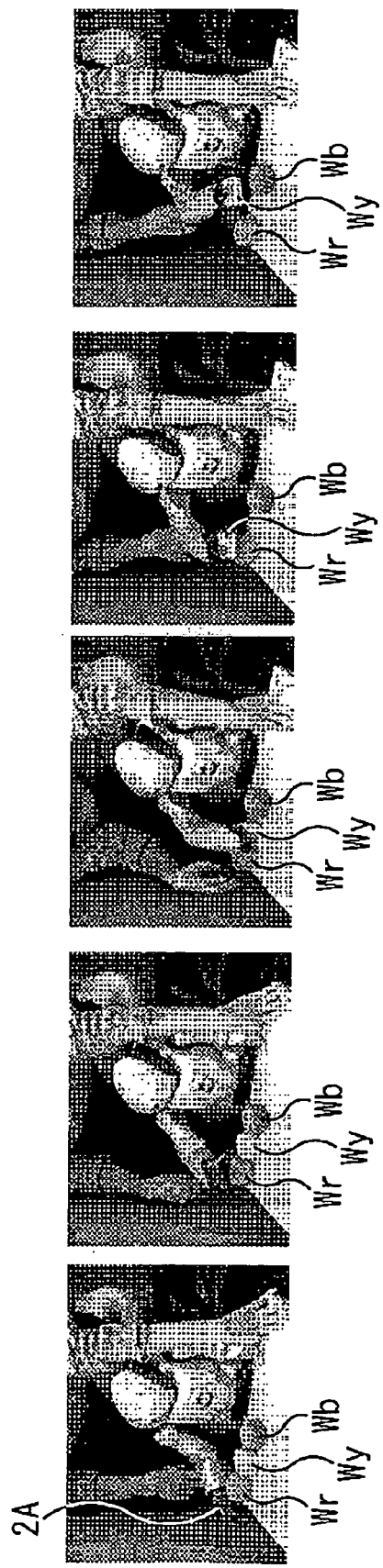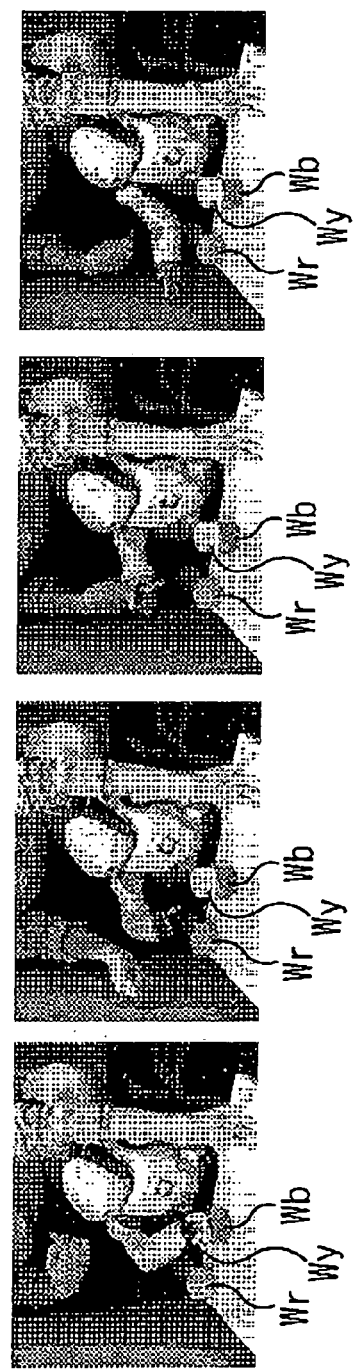
FIG.18E
FIG.18D
FIG.18C
FIG.18B
FIG.18A
FIG.18I
FIG.18H
FIG.18G
FIG.18F

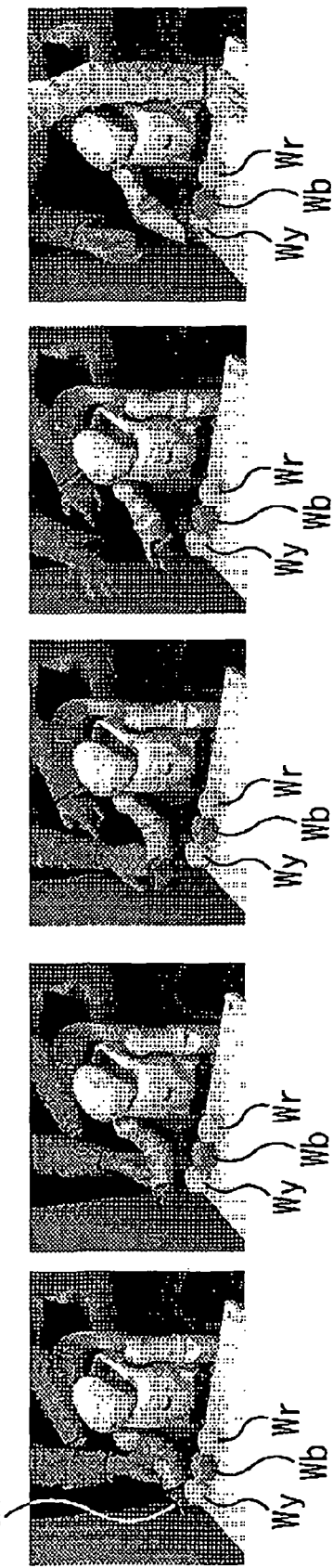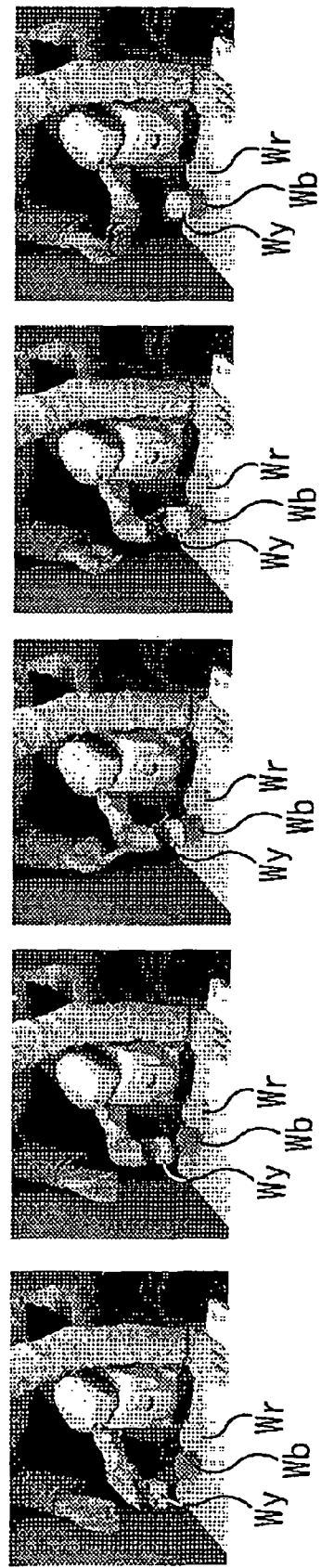

INFORMATION PROCESSING APPARATUS AND METHOD, AND PROGRAM FOR TEACHING AN ACTION TO A DEVICE IN A TIME-SERIES PATTERN

CROSS REFERENCES TO RELATED APPLICATIONS

The present invention contains subject matter related to Japanese Patent Application JP 2005-109249 filed in the Japanese Patent Office on Apr. 5, 2005, the entire content of which is incorporated herein by reference.

BACKGROUND OF THE INVENTION

1. Field of the Invention

The present invention generally relates to an information processing apparatus and method and a program, and more particularly, to an information processing apparatus and method and a program, for creating an action corresponding to teaching given by the user.

2. Description of the Related Art

With the recent technological innovation, there have been developed robots capable of acting in various manners. For having the robot make a user-desired action, however, the user has to teach the robot something for the action.

For having a humanoid type robot, for example, make an action on an external object, such as moving its hand to the object in a predetermined position (will be referred to as "reaching action" hereunder) or handling the object by hand, the user should have the robot structurally learn relations between its own motion and external object, not any single trajectory (trajectory in a control command or the like). To this end, the user should make teach the robot unilaterally as well as repeatedly correspondingly to the level of learning the robot has achieved.

Also, to teach the robot a plurality of actions in parallel, the user has to explicitly inform the robot of what action he is going to teach before starting the teaching.

Further, in case the user and robot interact with each other for cooperation, the user has to previously know the repertory of actions the robot can do.

SUMMARY OF THE INVENTION

As mentioned above, teaching the robot to act on an external object is not simple and cannot be done efficiently.

It is therefore desirable to overcome the above-mentioned drawbacks of the related art by providing an information processing apparatus and method and a program, for easily and efficiently teaching the robot to act on an external object.

According to the present invention, there is provided a first information processing apparatus including:

a learning means for learning a predetermined time-series pattern;

an output means for outputting a time-series pattern corresponding to the result of learning by the learning means; and an adjusting means supplied with a time-series pattern obtained from an action made by an action unit on the basis of a time-series pattern supplied from the output means and external teaching for the action to adjust a time-series pattern supplied from the output means correspondingly to the input time-series pattern, the learning means learning the time-series pattern supplied from the output means and adjusted by the adjusting means.

The external teaching may be given correspondingly to a user's touch on the action unit.

According to the present invention, there is also provided a second information processing apparatus including:

a learning means for learning a predetermined time-series pattern;

an output means for outputting a time-series pattern corresponding to the result of learning by the learning means; and an adjusting means supplied with a time-series pattern obtained from an action made by an action unit on the basis of a time-series pattern supplied from the output means and external teaching for the action to adjust a time-series pattern supplied from the output means correspondingly to the input time-series pattern.

Each of the above first and second information processing apparatuses is formed from a recurrent type neural network. In each of the apparatuses, the learning means can acquire, as the result of learning the time-series pattern, a weighting factor and parametric bias parameter in the recurrent type neural network, the output means can calculate the parametric bias parameter on the basis of the weighting factor and output a time-series pattern corresponding to the parametric bias parameter resulted from the calculation, and the adjusting means can be supplied with a time-series pattern obtained from an action made by the action unit on the basis of the time-series pattern supplied from the output means and time-series pattern obtained external teaching for the action to change the parametric bias parameter correspondingly to the input time-series pattern.

According to the present invention, there is also provided a first information processing method including the steps of:

learning a predetermined time-series pattern;

outputting a time-series pattern corresponding to the result of learning in the learning step; and receiving a time-series pattern obtained based on an action made by an action unit on the basis of a time-series pattern supplied from the outputting step and external teaching for the action to adjust a time-series pattern supplied from the outputting step correspondingly to the input time-series pattern, in the learning step, there being learned the time-series pattern supplied from the outputting means and adjusted by the adjusting means.

According to the present invention, there is also provided a first program including the steps of:

learning a predetermined time-series pattern;

outputting a time-series pattern corresponding to the result of learning in the learning step; and receiving a time-series pattern obtained based on an action made by an action unit on the basis of a time-series pattern supplied from the outputting step and external teaching for the action to adjust a time-series pattern supplied from the outputting step correspondingly to the input time-series pattern, in the learning step, there being learned the time-series pattern supplied from the outputting means and adjusted by the adjusting means.

In the above first information processing apparatus, method and program, learning is made of a predetermined time-series pattern, a time-series pattern corresponding to the result of learning is outputted, there is supplied a time-series pattern obtained based on an action made by an action unit on the basis of the output time-series pattern and external teaching for the action to adjust the output time-series pattern correspondingly to the input time-series pattern, and learning is made of the adjusted output time-series pattern.

According to the present invention, there is also provided a second information processing method including the steps of:

learning a predetermined time-series pattern;

outputting a time-series pattern corresponding to the result of learning in the learning step; and receiving a time-series pattern obtained based on an action made by an action unit on the basis of a time-series pattern supplied from the outputting step and external teaching for the action to adjust a time-series pattern supplied from the outputting step correspondingly to the input time-series pattern.

According to the present invention, there is also provided a second program including the steps of:

learning a predetermined time-series pattern;

outputting a time-series pattern corresponding to the result of learning in the learning step; and receiving a time-series pattern obtained based on an action made by an action unit on the basis of a time-series pattern supplied from the outputting step and external teaching for the action to adjust a time-series pattern supplied from the outputting step correspondingly to the input time-series pattern.

In the above second information processing apparatus, method and program, learning is made of a predetermined time-series pattern, a time-series pattern corresponding to the result of learning is outputted, and there is supplied a time-series pattern obtained based on an action made by an action unit on the basis of the output time-series pattern and external teaching for the action to adjust the output time-series pattern correspondingly to the input time-series pattern.

According to the present invention, a robot can be taught about an action to an external object easily and efficiently.

BRIEF DESCRIPTION OF THE DRAWINGS

FIGS. 5A-5C explains the operations of the controller 11 in FIG. 4;

FIGS. 17A-17H shows still another example of the autonomous action;

FIGS. 18A-18I shows yet another example of the autonomous action;

FIGS. 19A-19J shows still yet another example of the autonomous action;

DETAILED DESCRIPTION OF THE PREFERRED EMBODIMENTS

The present invention will be described in detail below concerning embodiments thereof with reference to the accompanying drawings. The subject matter as set forth in an appended Claim corresponds to an embodiment described herein. The following description is intended to confirm that an embodiment to support the invention as set forth in an appended Claim is disclosed herein. Therefore, even if any embodiment disclosed herein is not stated herein as corresponding to a subject matter as set forth in an appended Claim, it does not means that the embodiment does not correspond to the subject matter. On the contrary, even if an embodiment is disclosed herein as corresponding to a subject matter as set forth in an appended Claim, it does not mean that the embodiment does not correspond to any other than the subject matter.

Furthermore, the following description does not means that an invention corresponding to an embodiment disclosed herein as a whole is not set forth in an appended Claim. In other words, the following description does not deny existence of an invention corresponding to an embodiment disclosed herein but not set forth in any appended Claim, that is, an invention that will be added in future by divisional application or amending.

Figure 20:
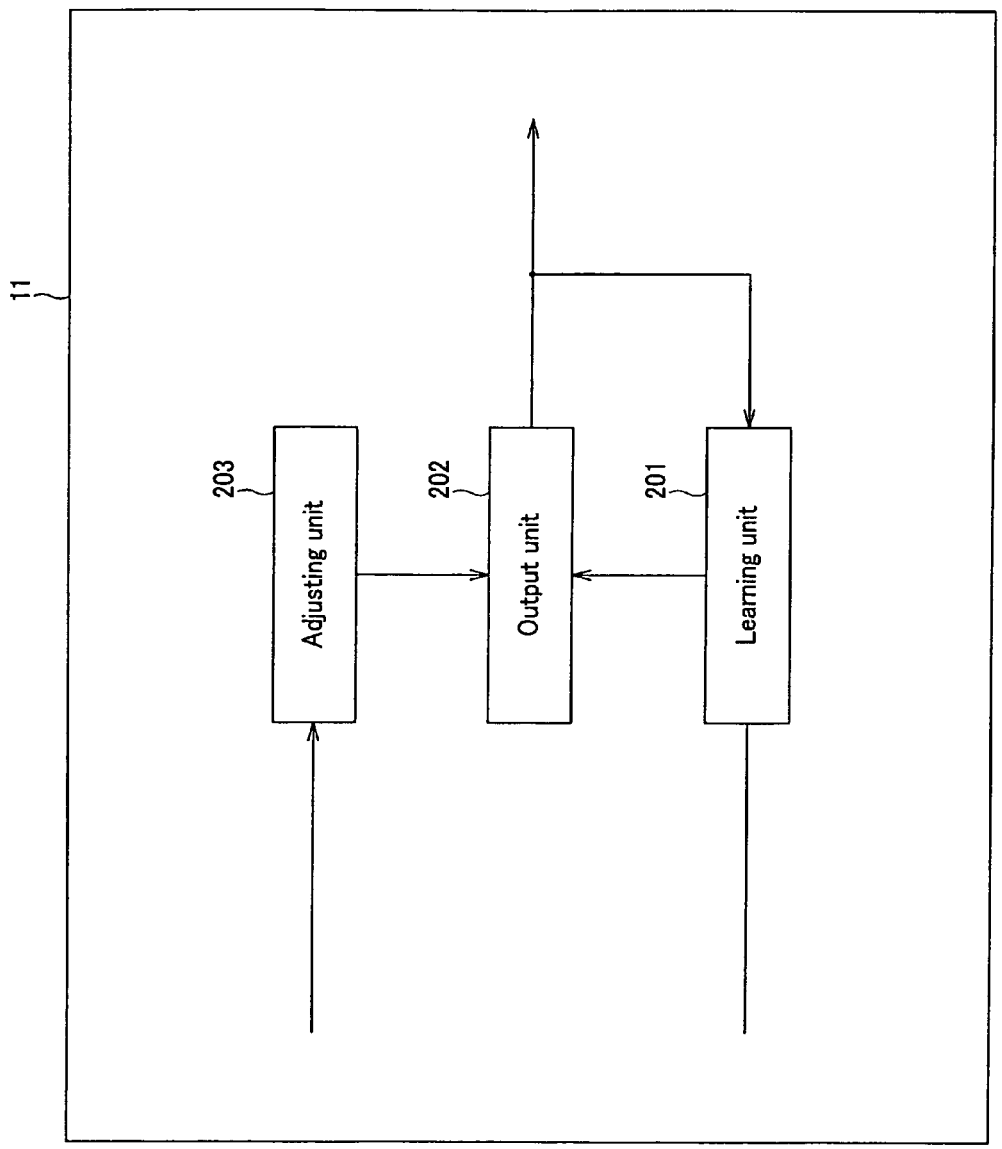
FIG. 20 is a schematic block diagram of the controller 11 in FIG. 3, showing another example of the controller configuration.

The information processing apparatus as set forth in Claim 1 includes:

a learning means for learning a predetermined time-series pattern (e.g., learning unit 201 in FIG. 20);

an output means for outputting a time-series pattern corresponding to the result of learning by the learning means (e.g., output unit 202 in FIG. 20); and an adjusting means supplied with a time-series pattern obtained from an action made by an action unit on the basis of a time-series pattern supplied from the output means and external teaching for the action to adjust a time-series pattern supplied from the output means correspondingly to the input time-series pattern (e.g., adjusting unit 203 in FIG. 20), the learning means learning the time-series pattern supplied from the output means and adjusted by the adjusting means.

Figure 2:
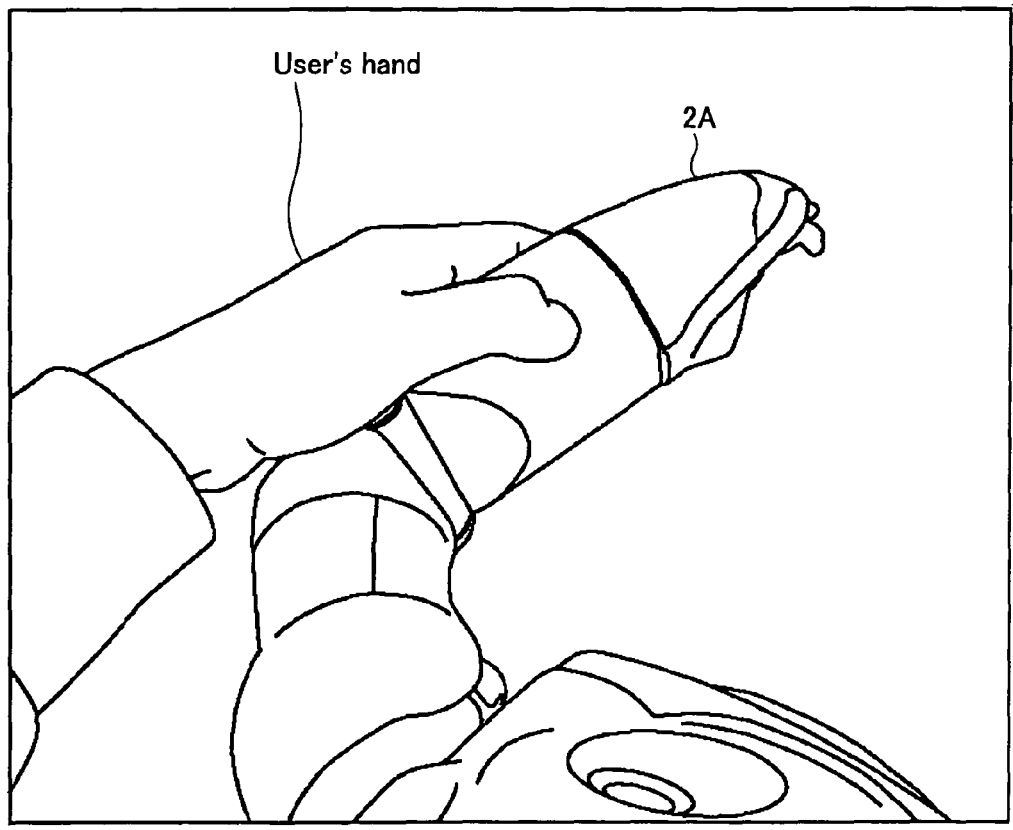
FIG. 2 explains direct teaching to the robot.

In the information processing apparatuses as set forth in Claims 2 and 7, the external teaching is given correspondingly to a user's touch on the action unit (e.g., direct teaching shown in FIG. 2).

The information processing apparatuses as set forth in Claims 3 and 8 is formed from a recurrent type neural network (e.g., RNN11 in FIG. 4), wherein:

the learning means acquires, as the result of learning the time-series pattern, a weighting factor and parametric bias parameter (e.g., parameter P) in the recurrent type neural network;

the output means calculates the parametric bias parameter on the basis of the weighting factor and output a time-series pattern corresponding to the parametric bias parameter resulted from the calculation; and the adjusting means can be supplied with a time-series pattern obtained from an action made by the action unit on the basis of the time-series pattern supplied from the output means and time-series pattern obtained external teaching for the action to change the parametric bias parameter correspondingly to the input time-series pattern.

The information processing method as set forth in Claim 4 and program as set forth in Claim 5 include the steps of:

learning a predetermined time-series pattern (e.g., operation of the learning unit 201 in FIG. 20);

outputting a time-series pattern corresponding to the result of learning in the learning step (e.g., operation of the output unit 202 in FIG. 20); and receiving a time-series pattern obtained based on an action made by an action unit on the basis of a time-series pattern supplied from the outputting step and external teaching for the action to adjust a time-series pattern supplied from the outputting step correspondingly to the input time-series pattern (e.g., operation of the adjusting unit 203 in FIG. 20), in the learning step, there being learned the time-series pattern supplied from the outputting means and adjusted by the adjusting means.

The information processing apparatus as set forth in Claim 6 includes:

a learning means for learning a predetermined time-series pattern (e.g., learning unit 201 in FIG. 20);

an output means for outputting a time-series pattern corresponding to the result of learning by the learning means (e.g., output unit 202 in FIG. 20); and an adjusting means supplied with a time-series pattern obtained from an action made by an action unit on the basis of a time-series pattern supplied from the output means and external teaching for the action to adjust a time-series pattern supplied from the output means correspondingly to the input time-series pattern (e.g., adjusting unit 203 in FIG. 20).

The information processing method as set forth in Claim 9 and program as set forth in Claim 10 include the steps of:

learning a predetermined time-series pattern (e.g., operation of the learning unit 201 in FIG. 20);

outputting a time-series pattern corresponding to the result of learning in the learning step (operation of the output unit 202 in FIG. 20); and receiving a time-series pattern obtained based on an action made by an action unit on the basis of a time-series pattern supplied from the outputting step and external teaching for the action to adjust a time-series pattern supplied from the outputting step correspondingly to the input time-series pattern (e.g., operation of the adjusting unit 203 in FIG. 20).

Figure 1:
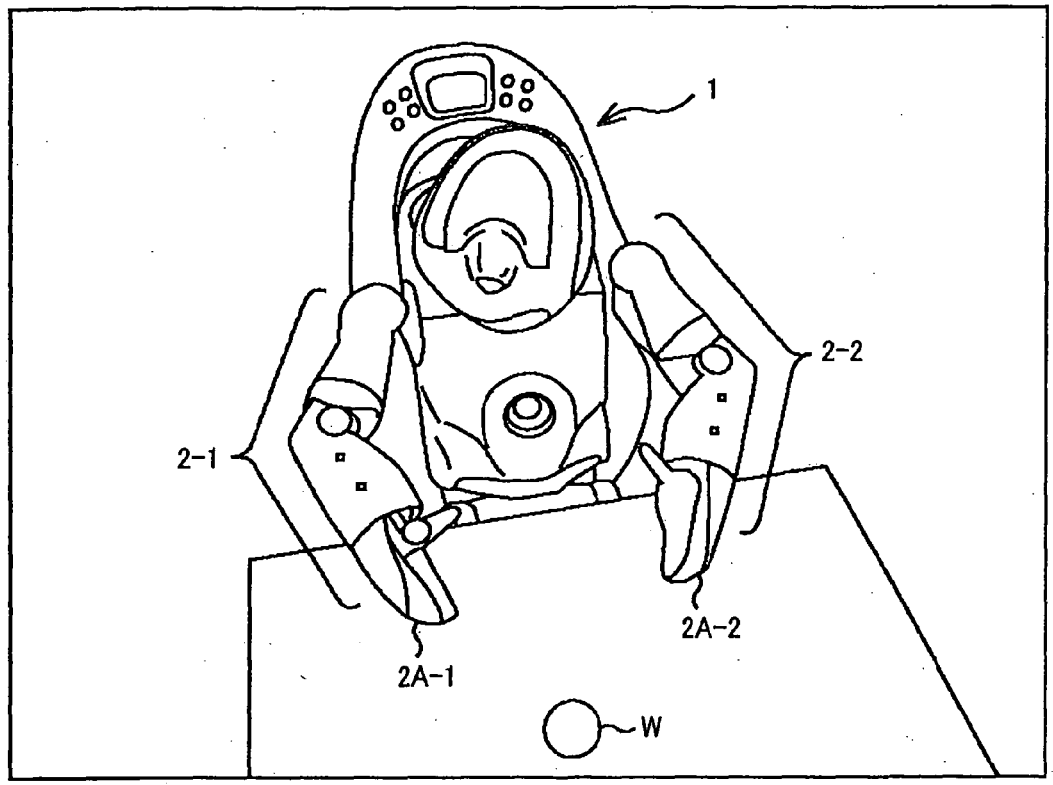
FIG. 1 schematically illustrates the appearance of a robot to which the present invention is applied, showing an example of the robot configuration.

Referring now to FIG. 1, there is schematically illustrated the appearance of a robot 1 to which the present invention is applied, showing an example of the robot configuration. The robot 1 is of a humanoid type and includes movable action units corresponding to the parts of a human body, such as an arm unit 2-1 corresponding to the right arm of the human body, arm unit 2-2 corresponding to the left hand (will be referred to simply as "arm unit 2" hereunder wherever they may not be referred to individually; this reference will also be applied to other units of the robot 1 hereunder), etc. The arm unit 2 includes a hand portion 2A corresponding to the hand of the human body.

The robot 1 can learn teaching given by the user and act correspondingly to the result of learning.

For example, once the user has moved the hand portion 2A of the hand 2 of the robot 1 to an object W which is in a predetermined relation with the hand portion 2A while holding the arm 2 in hand (namely, touching directly the robot 1 to teach the latter how to reach the object W; reaching action) as shown in FIG. 2 or once he or she has moved the object W with the hand portion 2A thus moved to the object W (object handling action), the robot 1 will be able to act as taught by the user. This teaching will further be described later.

Figure 3:
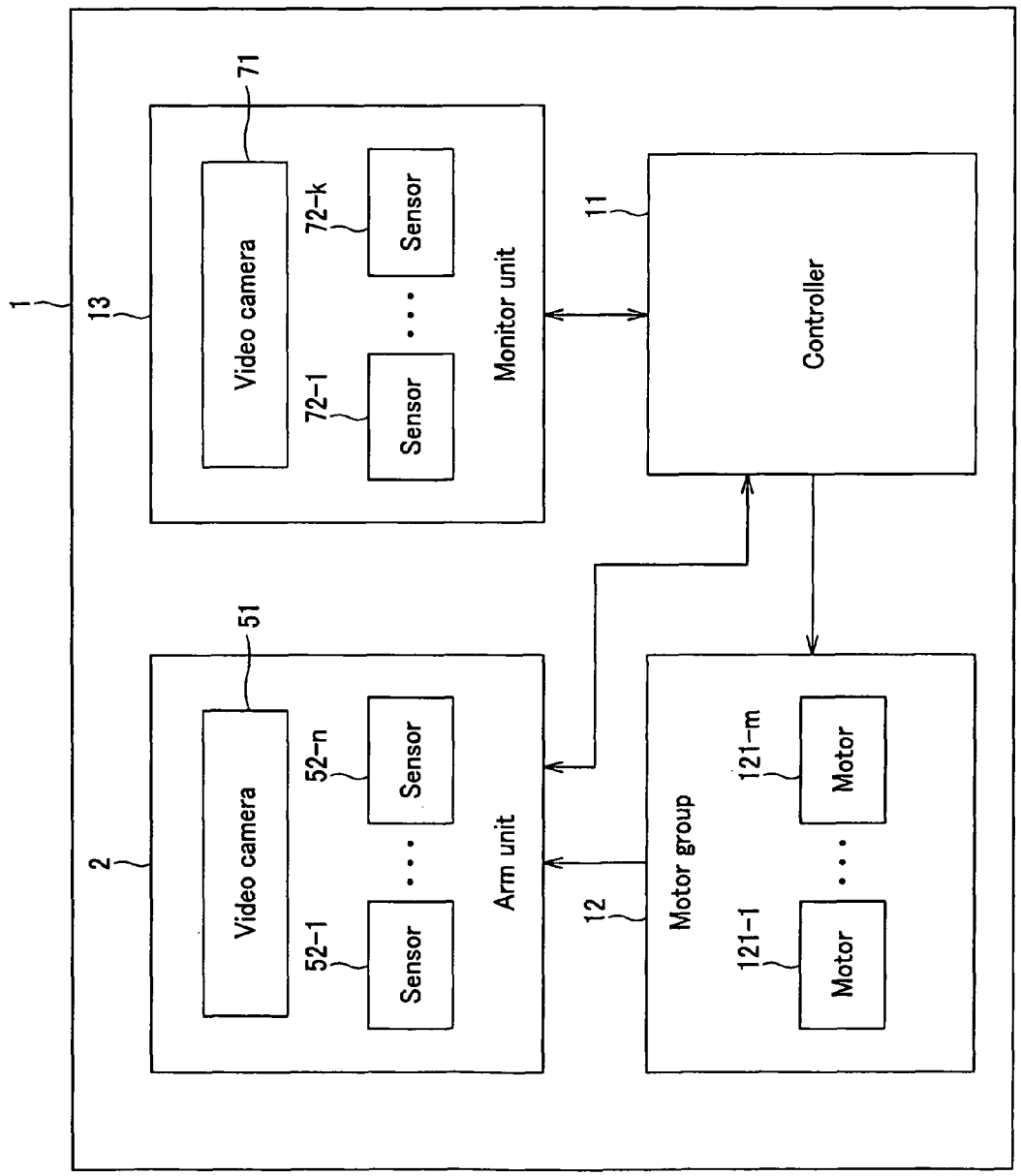
FIG. 3 is a schematic block diagram of an example of the internal configuration of the robot in FIG. 1.

FIG. 3 illustrates, in the form of a schematic block diagram, an example of the internal configuration of components of the robot 1, related with the present invention.

The arm unit 2 incorporates a video camera 51 installed in a predetermined place such as the hand portion 2A and various sensors 52-1 to 52-$n$ installed in predetermined places such as the hand portion 2A and including a sensor to detect an external pressure (pressure applied by the direct touch by the object W or user's hand), sensor to detect a position (x, y) of the object W in a picture captured by the video camera 51, etc.

The arm unit 2 also incorporates a motor group 12 including motors 121-1 to 121-$m$ (will be referred to as "motors 121" hereunder wherever appropriate) which drive the action units such as the arm unit 2, hand portion 2A, etc.

The robot 1 also includes a monitor unit 13 including a video camera 71 installed in a predetermined place such as the head unit of the robot 1 and various sensors 72-1 to 72-$k$ such as a sensor to detect a position (x, y) of the object W in a picture captured by the video camera 71, etc.

The robot 1 further includes a controller 11 to learn teaching given by the user and control each of the units of the robot 1 in order to have the robot 1 act according to the results of the learning.

For example, the controller 11 learns user's direct teaching (e.g., trajectory of the hand portion 2A as shown in FIG. 2) supplied at the time of learning according to an input vector time series (e.g., sensor input vectors $s_t$ (t=1, 2, ... ) from the sensors 52 and 72) generated correspondingly to that direct teaching.

The controller 11 also generates an output vector time series (e.g., motor command output vector mt for driving the motor 121) on the basis of the result of learning during an autonomous action, and outputs the output vector time series to each motor 121.

In this embodiment, the controller 11 is formed from a recurrent type neural network (RNN) having applied thereto the neural network having been studied as one model concerning the human and animal brains. Learning and autonomous action are implemented by calculation based on this model.

Figure 4:
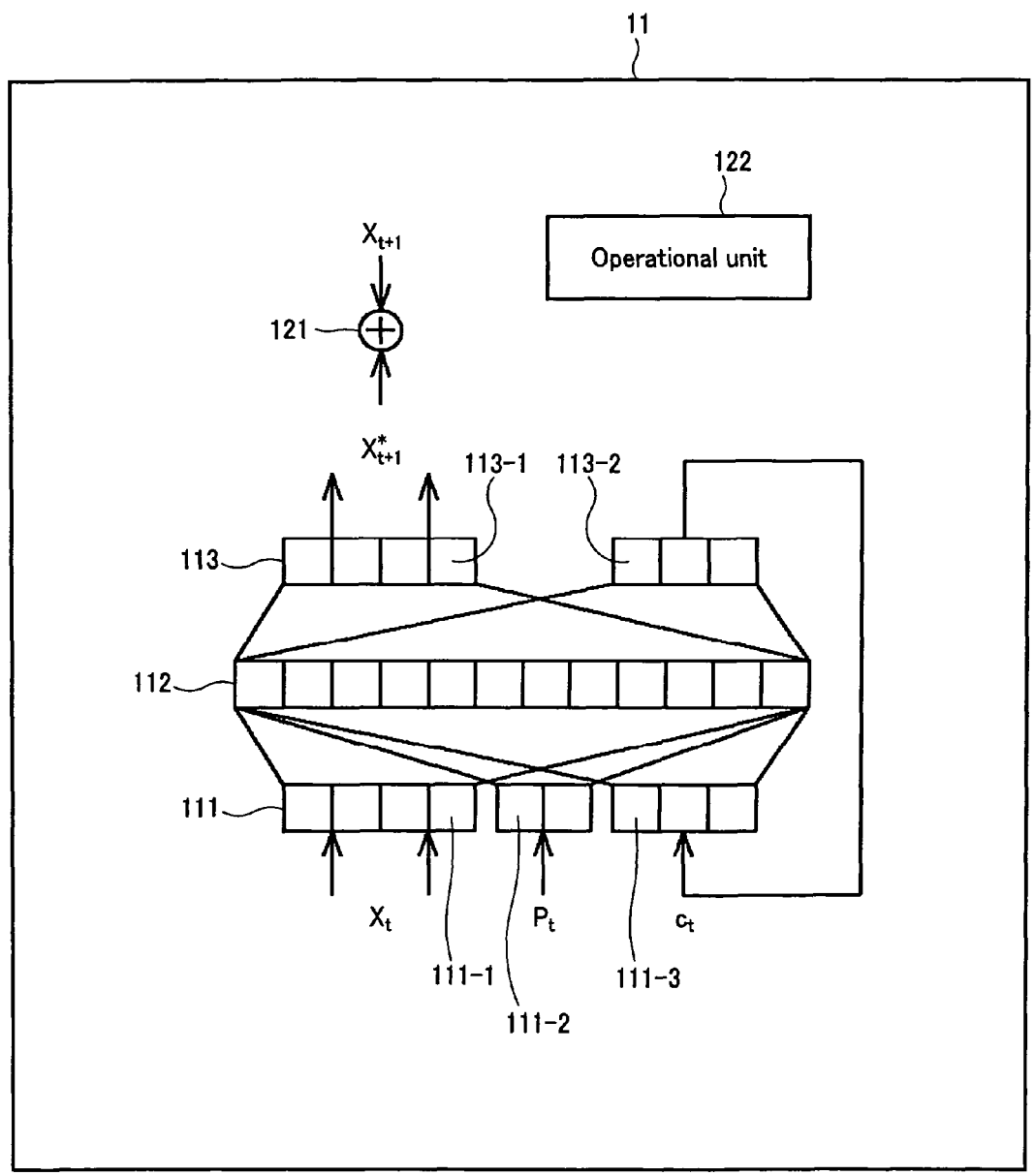
FIG. 4 explains an example of the configuration of a controller 11 in FIG. 3.

The "RNN" (will be referred to as "RNN 11" hereunder) is configured as shown in FIG. 4.

The RNN 11 includes an input layer 111, intermediate layer 112 and an output layer 113, each of which is formed from an arbitrary number of neurons.

A neuron 111-1 of the input later 111 is supplied with data $X_t$ (t=1, 2, ... ). A parametric bias node 111-2 which is a neuron of the input layer 111 is supplied with a parameter $P_t$. Further, data supplied from a neuron 113-2 of the output layer 113 as context data $c_t$ indicative of the internal state of the RNN 11 is fed back to a neuron 111-3 of the input layer 111.

Neurons of the intermediate layer 112 make weighting addition of input data, and output the results of addition one after another to a next stage. More particularly, the neurons make calculation (based on a nonlinear function) of the data $x_t$, parameter $P_t$ and context $c_t$ on the basis of a predetermined weighting factor, and then output the result of calculation to the output layer 113.

A neuron 113-1 of the output layer 113 outputs data $x^*_{t+1}$ corresponding to the input data.

The RNN 11 includes an operational unit 121 that makes learning based on back-propagation and another operational unit 122 that sets a weighting factor for the RNN 11.

That is, the RNN 11 can hold a plurality of dynamic structures by calculating a weighting factor and parameter, corresponding to a time-series pattern supplied at the time of learning, and associating the value of the parametric bias node (parameter $P_t$) with the time-series pattern.

After completion of the learning, the RNN 11 can output a time-series pattern (predicted) obtained as results of the learning and which corresponds to a coefficient and parameter P, and adjust the output time-series pattern by appropriately changing the parameter P correspondingly to the input time-series pattern (result).

It is assumed here that the RNN 11 is made to previously learn a time-series pattern A indicated with a curve L11, time-series pattern B indicated with a curve L12 and a time-series pattern C indicated with a curve L13 as shown in FIG. 5 so that learning of the time-series pattern A corresponding to the curve L11 will provide a parameter $P_A$ from the parametric bias node 111-2, learning of the time-series pattern B corresponding to the curve L12 provide a parameter $P_B$ and learning of the time-series pattern C corresponding to the curve L13 provide a parameter $P_C$, as shown in FIG. 5.

In this case, when, for example, the parameter $P_A$ is given to the RNN 11, the time-series pattern A will be outputted. On the contrary, when the parameter A is given to the RNN 11, the parameter $P_A$ will be outputted.

Note that even when supplied with any parameter other than the parameter P obtained by learning, the RNN 11 can generate a predetermined time-series pattern on the basis of the relation with the parameter P obtained by learning, and output the time-series pattern (it has a function of generalization).

The details of the RNN 11 are referred to the Japanese Patent Application Laid Open Nos. 2004-030627 and 2004-030628.

Next, teaching made by the user to the robot 1 will be explained concerning the action of reaching the object W on a desk (as shown in FIG. 1).

Figure 6B:
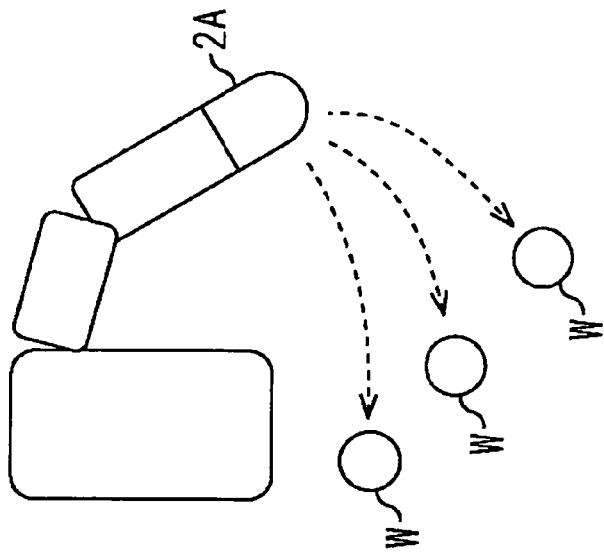
FIGS. 6A-6B explains the reaching action.
Figure 6A:
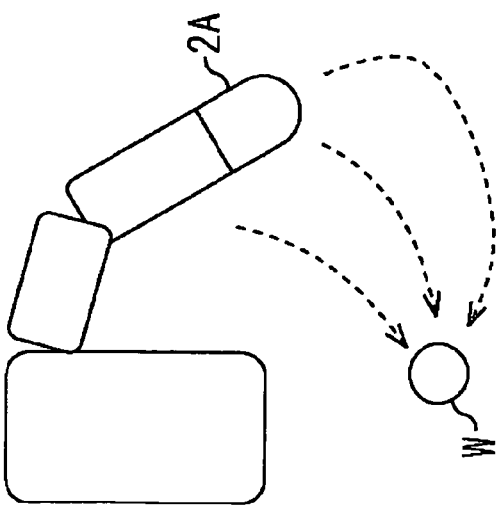

Given a position of the object W, the robot 1 can make the reaching action to move the hand portion 2A from an arbitrary initial position to the object W (will be referred to as "first reaching action" hereunder) as shown in FIG. 6A, and to move the hand portion 2A from a predetermined initial position to the object W in an arbitrary position (will be referred to as "second reaching action" hereunder) as shown in FIG. 6B.

First, there will be described teaching for the first reaching action (to move the hand portion 2A from the arbitrary initial position to the object W when the position of the object W is given, as shown in FIG. 6A) (will be referred to as "first teaching" hereunder).

Figure 7A:
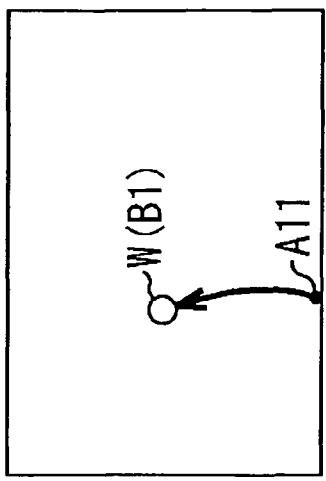
FIGS. 7A-7F explains teaching of the reaching action.

It is assumed here that the hand portion 2A of the robot 1 is in a position A11 while the object W is in a position B1 (the hand portion 2A and object W are in such a physical relation with each other) as shown in FIG. 7A. First, the user holds the hand portion 2A of the robot 1 (as in FIG. 2) and then moves it in the direction of solid-line arrow in FIG. 7A to the object W.

With this teaching, the robot 1 will learn a trajectory along which the hand portion 2A around the position A11 is moved to around the position B1. As a result, the robot 1 can move the hand portion 2A from the position A11 or from around the latter, for example, from the position A12 or A13 (to be more accurate, position A12 or A13 in a physical relation with the position B1) in the direction of an arrow starting at a position A12 or A13 in FIG. 7B to the object W.

Figure 7B:
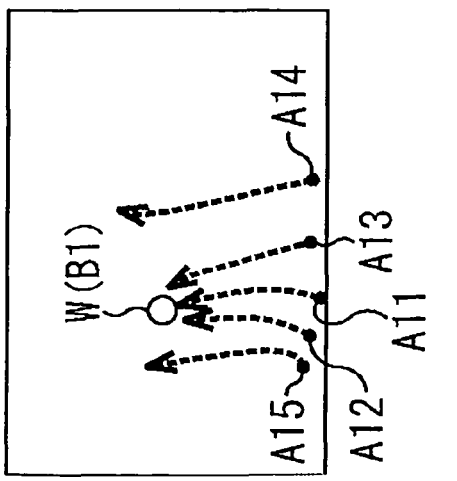

With only the above teaching, however, the robot 1 will not be able to have the hand portion 2A from an initial position away from the position A11, such as the position A14 or A15, to the object W (as indicated with an arrow starting at a position A14 or A15 in FIG. 7B).

Figure 7C:
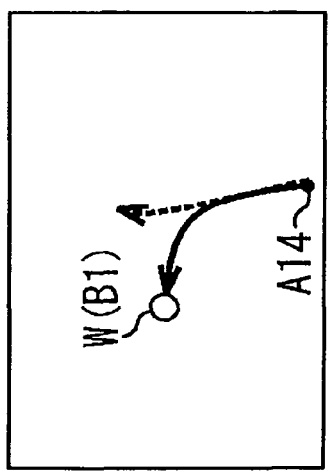

On this account, the robot 1 is then made to autonomously move the hand portion 2A from the position A14 as shown in FIG. 7C to the object W. In this case, the hand portion 2A of the robot 1 moves along a trajectory indicated with a broken line in FIG. 7C as above (moves away from the object W).

When the hand portion 2A of the robot 1 is going to leave the object W, the user holds the arm unit 2 of the robot 1 and guides it so that the hand portion 2A of the robot 1 will move to the object W as indicated with a solid-line arrow in FIG. 7C.

Having thus been taught, the robot 1 will further learn a trajectory along which the hand portion 2A around the position A14 is moved to around the position B1. As a result, the robot 1 will be able to move the hand portion 2A to the object W even when the hand portion 2A is initially around the position A14 as shown in FIG. 7D.

Figure 7D:
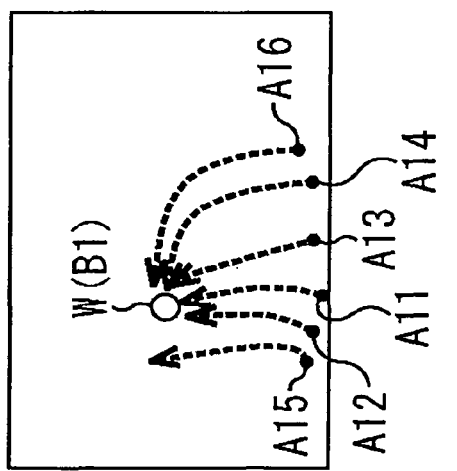

With only the above teaching, however, the robot 1 will not be able to move the hand portion 2A from the position A15 to the object W (as indicated with an arrow starting at the position A15 in FIG. 7D).

Figure 7E:
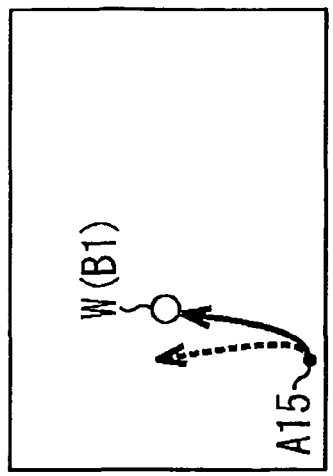

On this account, the robot 1 is further made to autonomously move the hand portion 2A from the position A15 as shown in FIG. 7E to the object W. In this case, the hand portion 2A of the robot 1 moves along a trajectory indicated with a broken line in FIG. 7E as above (moves away from the object W).

When the hand portion 2A of the robot 1 is going to leave the object W, the user holds the arm unit 2 of the robot 1 and guides it so that the hand portion 2A of the robot 1 will reach the object W as indicated with a solid-line arrow in FIG. 7E.

Figure 7F:
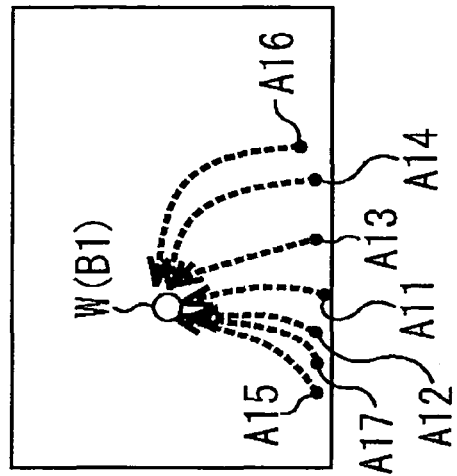

Having thus been taught, the robot 1 will further learn a trajectory along which the hand portion 2A around the position A15 is moved to around the position B1. As a result, the robot 1 will be able to move the hand portion 2A to the object W even when the hand portion 2A is initially around the position A15 as shown in FIG. 7F.

As above, the teaching is made to move the hand portion 2A from an arbitrary initial position to the object W (first reaching action) when a position of the object W is given.

Next, there will be described teaching for the second reaching action to move the hand portion 2A from an arbitrary initial position to the object W in an arbitrary position as shown in FIG. 6B (will be referred to as "second teaching" hereunder).

This teaching is basically similar to the first teaching having been explained above. Namely, the user holds the arm unit 2 of the robot 1 and guides it to the object W. It should be noted that in this case, the second teaching is to be made following the first teaching.

Figure 8A:
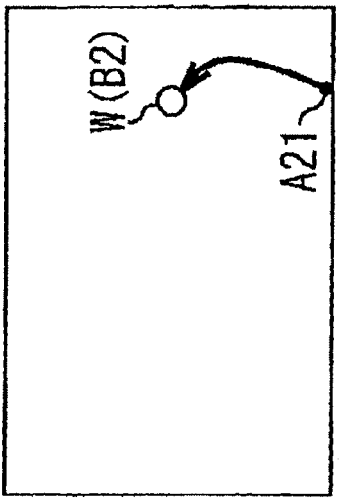
FIGS. 8A-8F also explains the teaching of the reaching action.

It is assumed here that the hand portion 2A of the robot 1 is in a position A21 while the object W is in a position B2 different from the position B1 (the hand portion 2A and object W are in such a physical relation with each other) as shown in FIG. 8A. First, the user holds the arm unit 2 of the robot 1 and then moves it in the direction of solid-line arrow in FIG. 8A to the object W.

Figure 8B:
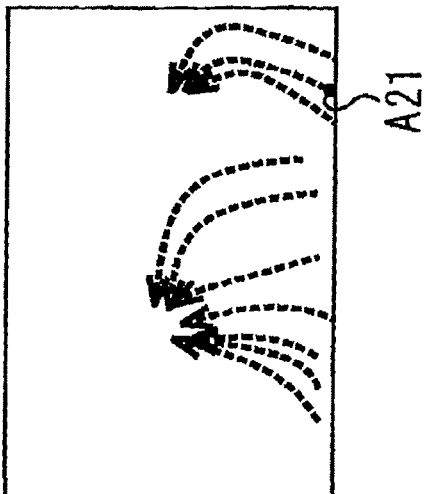

Having thus been taught, the robot 1 will further learn a trajectory along which the hand portion 2A around the position A21 is moved to around the position B2. As a result, the robot 1 will be able to move the hand portion 2A around the position A21 to the object W around the position B2 as shown in FIG. 8B.

Figure 8C:
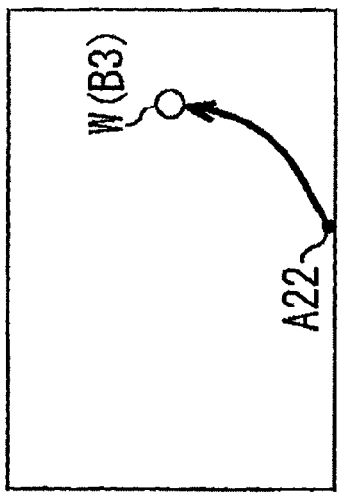

Next, the initial position of the hand portion 2A of the robot 1 is changed to a position A22 while the position of the object W is changed to a position B3, as shown in FIG. 8C. The user holds the arm 2 of the robot 1 and then moves the hand portion 2A of the robot 1 in a direction indicated with a solid-line arrow in FIG. 8C to the object W.

Figure 8D:
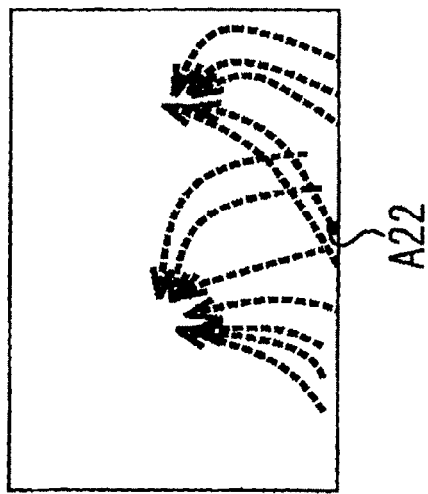

Having thus been taught, the robot 1 will further learn a trajectory along which the hand portion 2A around the position A22 is moved to around the position B3. As a result, the robot 1 will be able to move the hand portion 2A from around the position A22 to the object W around the position B3 as shown in FIG. 8D.

Figure 8E:
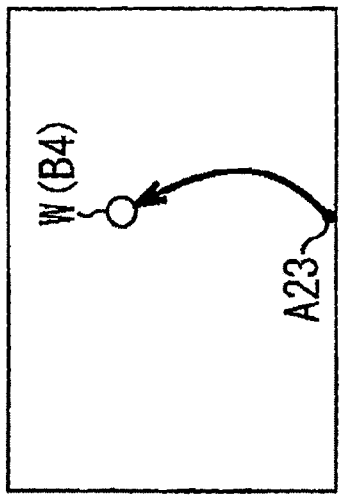

Next, the initial position of the hand portion 2A of the robot 1 is changed to a position A23 while the position of the object W is changed to a position B4, as shown in FIG. 8E. The user holds the arm 2 of the robot 1 and then moves the hand portion 2A of the robot 1 in a direction indicated with a solid-line arrow in FIG. 8E to the object W.

Having thus been taught, the robot 1 will further learn a trajectory along which the hand portion 2A is moved from around the position A23 to around the position B4. As a result, the robot 1 will be able to move the hand portion 2A from around the position A23 to the object W around the position B4 as shown in FIG. 8F.

The teaching (second teaching) for moving the hand portion 2A from a predetermined initial position to the object W in an arbitrary position is made as above.

Figure 8F:
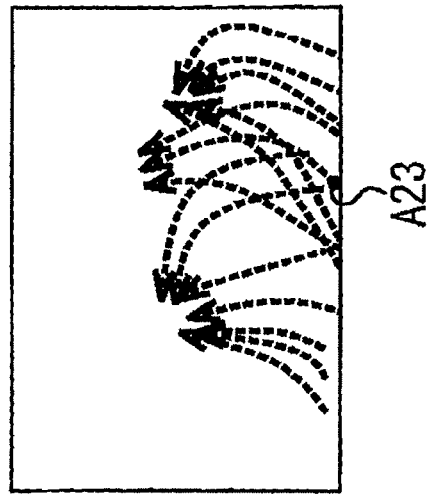

With the first and second teaching for the first and second reaching actions, the robot 1 will be able to know the relation between the object W and arm unit 2 and make the reaching action along a trajectory shown in FIG. 8F.

The user can teach the robot about the reaching action as having been described above.

Figure 9:
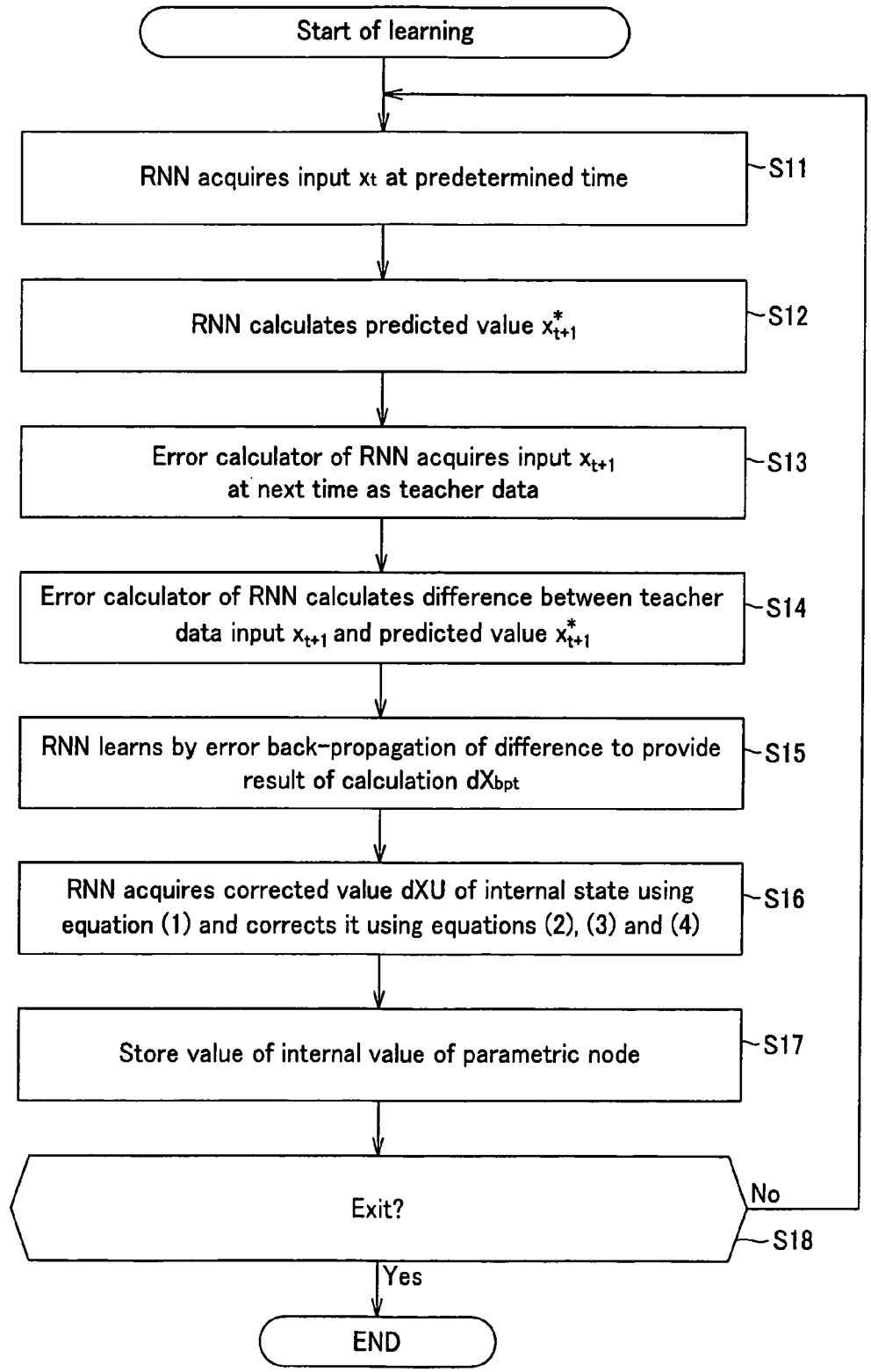
FIG. 9 shows a flow of operations made for learning.

The robot 1 will learn the aforementioned teaching as will be described below with reference to the flow diagram shown in FIG. 9.

First in step S11, the neuron 111-1 of the input layer 111 of the controller (or RNN in FIG. 4) 11 acquires the input $x_t$ at a predetermined time t.

In step S112, the intermediate layer 112 of the RNN 11 calculates the input $x_t$ on the basis of the weighting factor, and outputs a predicted value $x^*_{t+1}$ from the neuron 113-1 of the output layer 113.

In step S13, the operational unit 121 acquires an input $x_{t+1}$ at a next time t+1 as teacher data.

In step S14, the operational unit 121 calculates a difference between the teacher input $x_{t+1}$ acquired in step S13 and predicted value $x^*_{t+1}$ calculated in step S12.

In step S15, the RNN 11 is supplied with the difference calculated in step S14 from the neuron 113-1 of the output layer 113 and propagates it to the intermediate layer 112 and then to the input layer 111 to provide a result of calculation $dX_{bpt}$.

In step S16, the intermediate layer 112 acquires a corrected value dXU of the internal state as given by the following equation (1):

$$dXU_t = k_{bp} \cdot \sum_{t-\frac{1}{2}}^{t+\frac{1}{2}} dX_{bpt} + k_{nb} \cdot (XU_{t+1} - XU_t + XU_{t-1} - XU_t) \quad (1)$$

Further, the intermediate layer 112 corrects the corrected value dXU as given by the following equations (2), (3) and (4):

$$dlXU_t = \epsilon \cdot dXU_t + \text{monentum} \cdot dlXU_t \quad (2)$$

$$XU_t = XU_t + dlXU_t \quad (3)$$

$$X_t = \text{sigmoid}(XU_t) \quad (4)$$

In step S17, the parametric bias node 111-2 stores a value (parameter P) of the internal state.

Next in step S18, the RNN 11 judges whether it is to exit the learning. In case it is determined that it is not to exit the learning, the RNN 11 returns to step S11 where it will repeat the subsequent steps of operation.

In case it is determined in step S18 that it is to exit the learning, the RNN 11 will exit the learning.

With the above operations for the learning, one time-series pattern is learned for the RNN 11.

In the learning of the teaching for the above reaching action (in FIG. 7), a sensor input vector $s_t$ (t=1, 2, . . . ) (when the hand portion 2A is moved along the trajectory indicated with the solid line in FIG. 7C or 7E) resulted from interaction between a force with which the arm unit 2 of the robot 1 autonomously moves and a force applied to the arm unit 2 when the user has made the direct teaching (touch) and motor command output vector $m_t$ are supplied as an input $x_t$ at a predetermined time to the input layer 111 (as in step S11), and the input $x_t$ is calculated on the basis of the weighting factor to provide a predicted value $x^*_{t+1}$ at a next time (as in step S12).

Note that in this embodiment, the sensor vector s includes joint-angle information on the arm unit 2 of the robot 1 and positional information on an external object (object W) and the motor command output vector m includes joint-angle command value etc. of the arm unit 2.

Next, the sensor input vector $s_{t+1}$ at the time t+1 and motor command output vector $m_{t+1}$ are supplied as the input $x_{t+1}$ to the operational unit 121 (as in step S13) in which a difference between the teacher data input $x_{t+1}$ and predicted value $x^*_{t+1}$ is calculated (as in step S14).

A weighting factor and parameter P are calculated based on the calculated difference (as in steps S15 to S17).

Note that the weighting factor is changed by the back-propagation used in the ordinary neural network.

The learning having been explained above with reference to the flow diagram in FIG. 9 is done for each of the time-series patterns for the robot 1 to learn. In other words, an imaginary RNN is prepared for each of time-series patterns for the robot 1 to learn, and the learning shown in FIG. 9 is done for each of the imaginary RNNs.

In the first teaching shown in FIG. 7, for example, the RNN 11 learns three time-series patterns (learning the sensor input vector $s_t$ and motor command output vector $m_t$ when the hand portion 2A is moved along a trajectory indicated with the solid line in FIG. 7A, 7C or 7E). In this case, three imaginary RNNs 11 are prepared, and the learning as in FIG. 9 is done for each of the imaginary RNNs 11 as shown in FIG. 10.

Figure 10A:
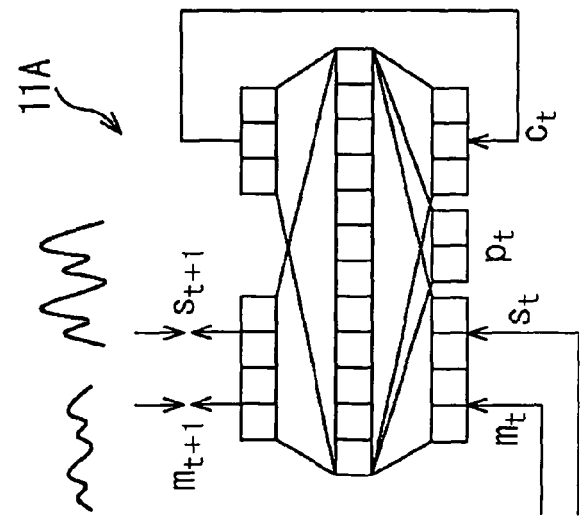
FIGS. 10A-10C shows operations, for learning, of the controller 11 in FIG. 4.
Figure 10B:
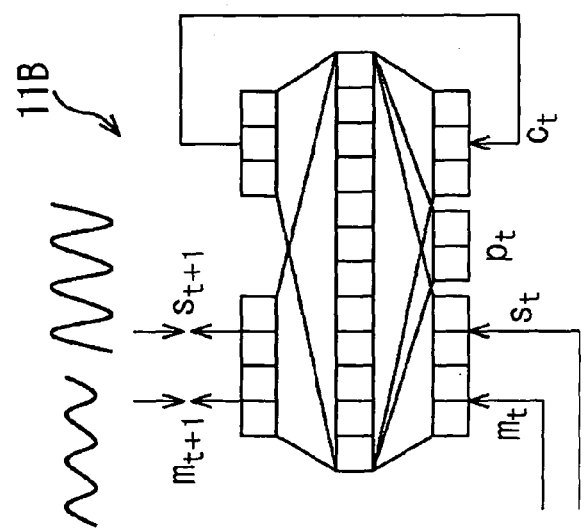
Figure 10C:
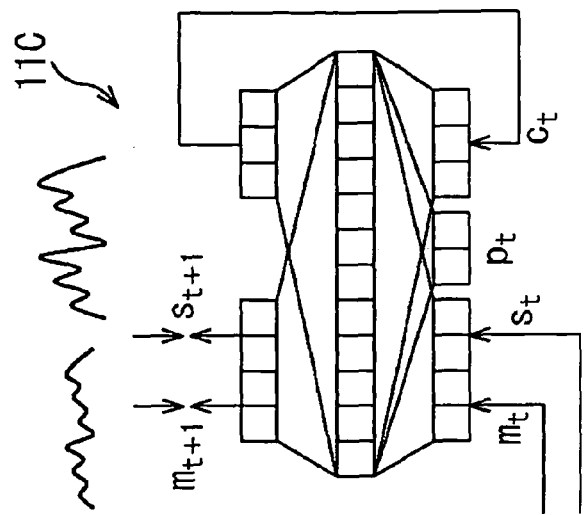

In the example shown in FIG. 10, an RNN 11A learns a time-series pattern (sensor input vector $s_t$ and motor command output vector $m_t$) when the hand portion 2A is moved along a trajectory indicated with a solid line in FIG. 7A, RNN 11B learns a time-series pattern when the hand portion 2A is moved along a trajectory indicated with a solid line in FIG. 7C, and an RNN 11C learns a time-series pattern when the hand portion 2A is moved along a trajectory indicated with a solid line indicated in FIG. 7E.

Figure 11:
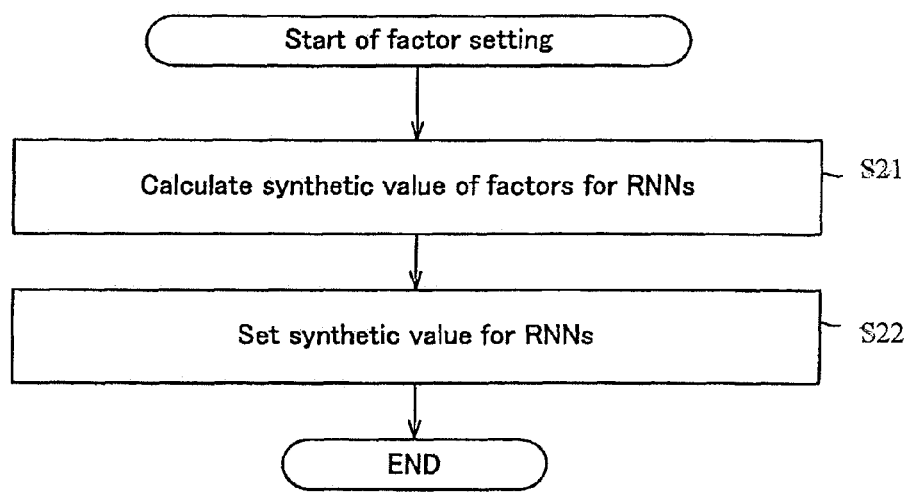
FIGS. 11A-11C shows another flow of operations made for learning.

After learning of a plurality of time-series patterns as above, the parameters P acquired by learning the time-series patterns are held as the results of learning, respectively, and the weighting factors obtained through the learning are set in the real RNN 11. The weighting factors are set in the RNN 11 as will be described below with reference to the flow diagram in FIG. 11.

In step S21, the operational unit 122 of the RNN 11 (in FIG. 4) calculates a synthetic value by combining together the weighting factors resulted from the learning by the imaginary RNNs as in the learning having been explained above with reference to the flow diagram in FIG. 9. The synthetic value may be a mean value, for example. That is, a mean value of the weighting factors in the imaginary RNNs is calculated here.

Next in step S22, the operational unit 122 sets the synthetic value (mean value) calculated in step S21 as a weighting factor in the neuron of the intermediate layer 112 of the real RNN 11.

Thus, weight factors obtained through learning of a plurality of time-series patterns will be set in each neuron of the intermediate layer 112 of the real RNN 11.

With the above learning, information on a dynamic structure commonly usable in generating a plurality of teaching time-series patterns will be held for the weighting factor of each neuron in the intermediate layer 112, and information (parameter P) necessary for switching the dynamic structure commonly usable as above to a suitable one for generating each of the teaching time-series patterns be set in the parametric bias node 111-2 of the input layer 111.

More specifically, with the learning for the reaching action, information on a dynamic structure commonly usable in generating a plurality of teaching time-series patterns (sensor input vector $s_t$ and motor command output vector $m_t$ when the hand portion 2A is moved along a trajectory indicated with a solid line in FIG. 7A, 7C or 7E) will be held for the weighting factor of each neuron in the intermediate layer 112, and information (parameter P) necessary for switching the dynamic structure commonly usable as above to a suitable one for generating each of the teaching time-series patterns be set in the parametric bias node 111-2.

Thus, learning is made in response to user's direct teaching.

That is, according to the present invention, the robot 1 acting in response to preceding teaching can be taught to make an action complementing the present one, to thereby improve the accuracy of action. Thus, the robot 1 can be taught efficiently to make an action on an external object. Also, the robot 1 can be taught to make a complicated action incorporating actions the robot 1 has already learned. Further, the user can have deeper knowledge of the bodily limitation and learning ability of the robot 1 more deeply through such a teaching, and thus can make more effective teaching to the robot 1.

Also, since the user can confirm the action of the robot 1 by actually seeing it and teach the robot 1 according to the result of confirmation, so he or she has not to know the repertory of actions of the robot 1 in advance.

As will be seen from the above, the robot 1 can learn various actions from the user's teaching, and the user can have deeper knowledge of the action characteristics of the robot 1. So, it is expectable that the user and robot 1 can interact with each other more smoothly and deeply.

Figure 12:
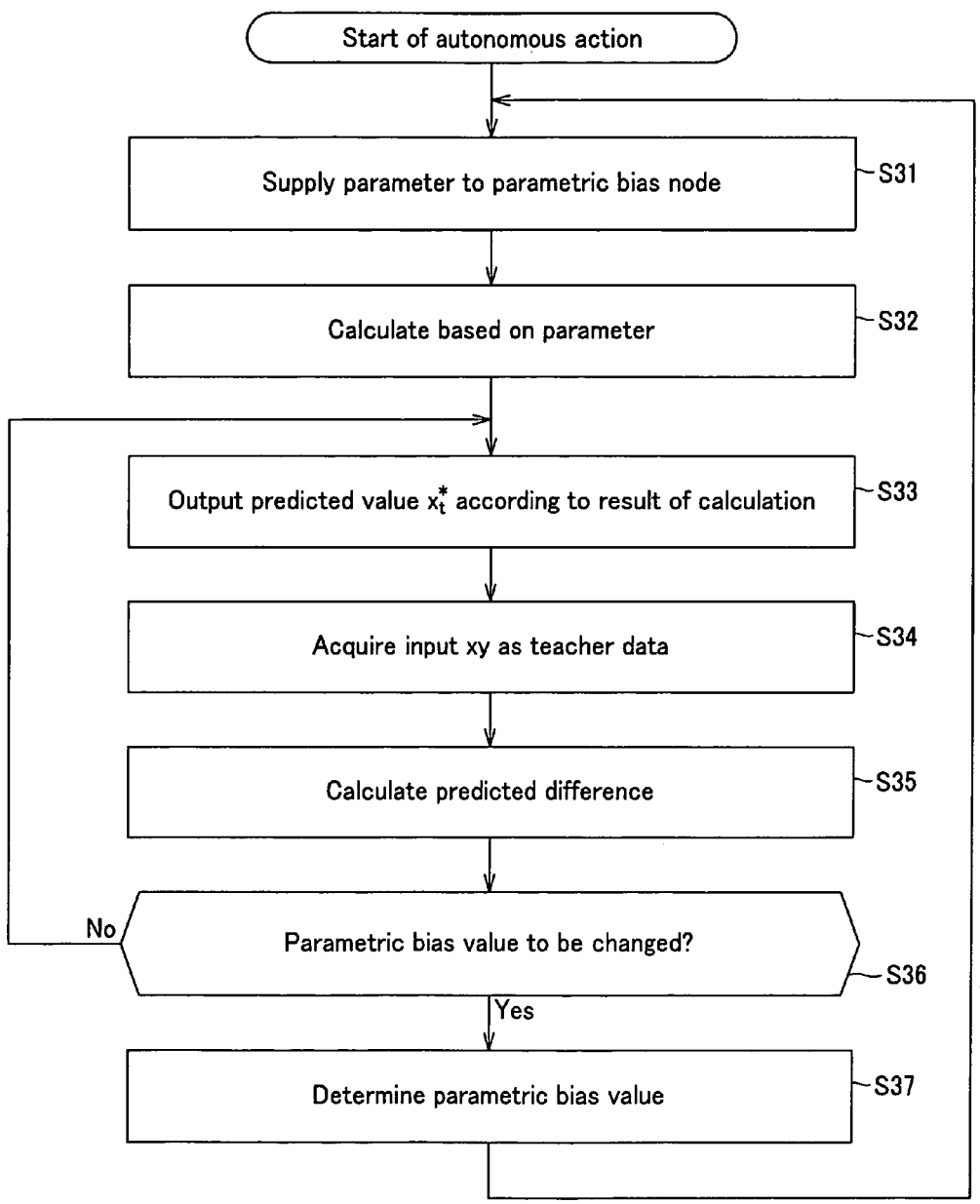
FIG. 12 shows a flow of operations made for autonomous action.

Next, the autonomous action of the robot 1 having learned as above will be explained below with reference to the flow diagram in FIG. 12.

First in step S31, the parametric bias node 111-2 of the RNN 11 is supplied with the parameter P.

In step S32, the intermediate layer 112 makes weighting factor-based calculation of the parameter P supplied to the parametric bias node 111-2 in step S31.

Then in step S33, the neuron 113-1 of the output layer 113 in the RNN 11 supplies the operational unit 121 with a predicted value $X^*_t$ at a predetermined time t, corresponding to the parameter P supplied in step S31.

In step S34, the operational unit 121 acquires input t at a time t as teacher data.

In step S35, the operational unit 121 calculates a difference between the predicted value $x^*_t$ and teacher data input $x_t$.

In step S36, the RNN 11 judges, based on the result of calculation from step S35, whether the parametric bias value (parameter P) of the parametric bias node 111-2 is to be changed. In case it has been determined because the difference is large that the parametric bias value should be changed, the RNN 11 goes to step S37 where it will determine a parametric bias value (parameter P) corresponding to the difference.

After that, the RNN 11 returns to step S31 and the parametric bias node 111-2 is supplied with the parameter P determined in step S37. Thereafter, the operations in step S32 and subsequent steps are effected as above.

If it has been determined in step S36 that the parametric bias value has not to be changed, the RNN 11 returns to step S33 in which the operations in this step and subsequent steps will be effected as above.

In an autonomous action of the robot 1 having learned the teaching for the aforementioned reaching action (as in FIGS. 7 and 8), one of the parameters P resulted from the learning, for moving the hand portion 2A from a present position of the latter to a present position of the object W (parameter P for outputting a sensor input vector $s_t$ and motor command output vector $m_t$ when the hand portion 2A is moved along the trajectory between the positions), is supplied to the parametric bias node 111-2 (in step S31).

In the parametric bias node 111-2 calculates the input parameter P on the basis of a weighting factor (in step S32), and outputs a predicted value $s^*_t$ of the sensor input vector $s_t$, corresponding to the calculated, to the operational unit 121. It should be noted that the parametric bias node 111-2 also outputs a motor command output vector $m_t$ corresponding to the calculation.

The operational unit 121 acquires the sensor input vector $s_t$ supplied correspondingly to an action of the robot 1, based on the motor command output vector $m_t$ from the parametric bias node 111-2, as teacher data input $x_t$ (in step S34), and calculates a difference between the sensor input vector $s_t$ itself and predicted value $s^*_t$ of the sensor input vector $s_t$.

In case the calculated difference is small, that is, in case the relation between the hand portion 2A and object W has varied as predicted (when the hand portion 2A has approached the object W as predicted), the parametric bias value will not be changed but a sensor input vector s and motor command output vector m (time-series pattern), corresponding to the parameter P, will continuously be outputted.

On the contrary, if the difference is large, the parametric bias value (parameter P) will be changed, and the sensor input vector s and motor command output vector m will be outputted correspondingly to the value of the parameter P.

Figure 13:
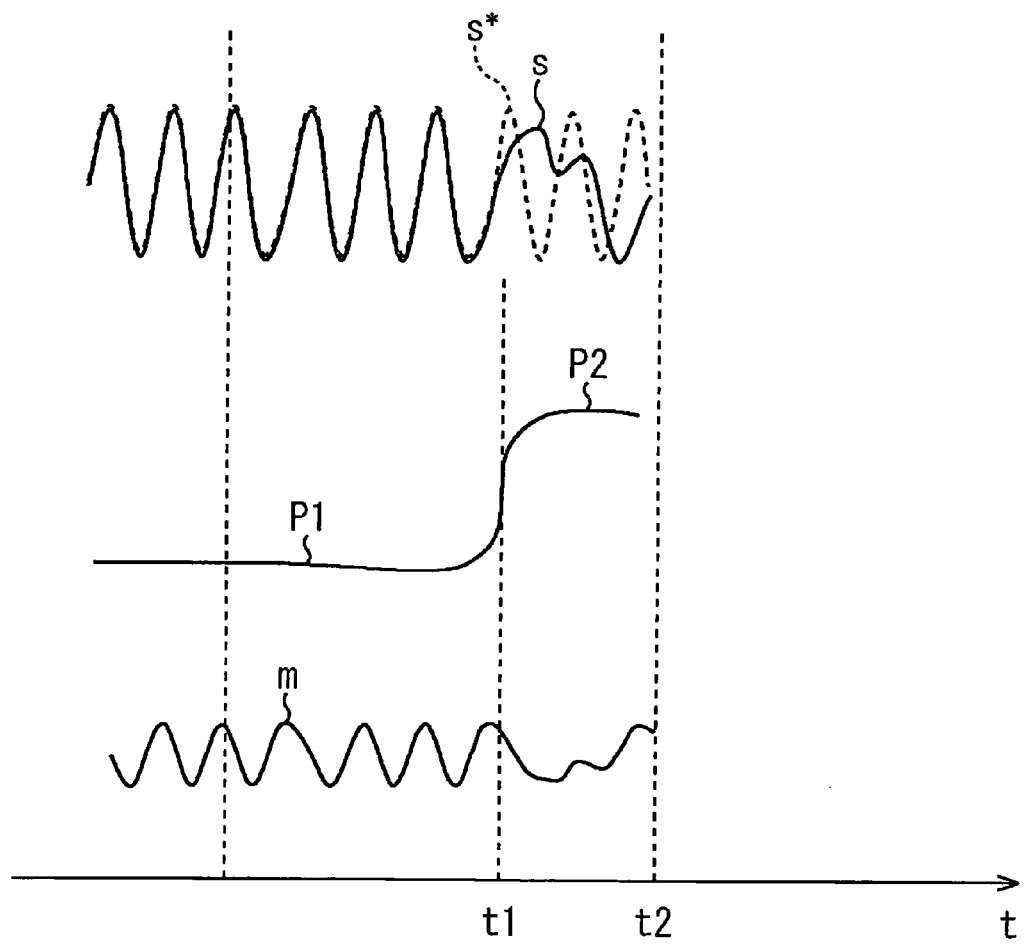
FIG. 13 explains the autonomous action.

In an example shown in FIG. 13, since the difference between the predicted value s* of the sensor input vector s and sensor input vector s itself has become large at and after a time t1, the parametric bias value is changed from the parameter P1 to parameter P2. As a result, the output of the motor command output vector m is changed at and after the time t1.

The difference becomes large when the prediction has been incorrect or when the position of the object W has been changed from a position B2 to position B3 (as in FIG. 8) and the user has pushed the arm unit 2 a little toward the position B3, for example.

Figure 14:
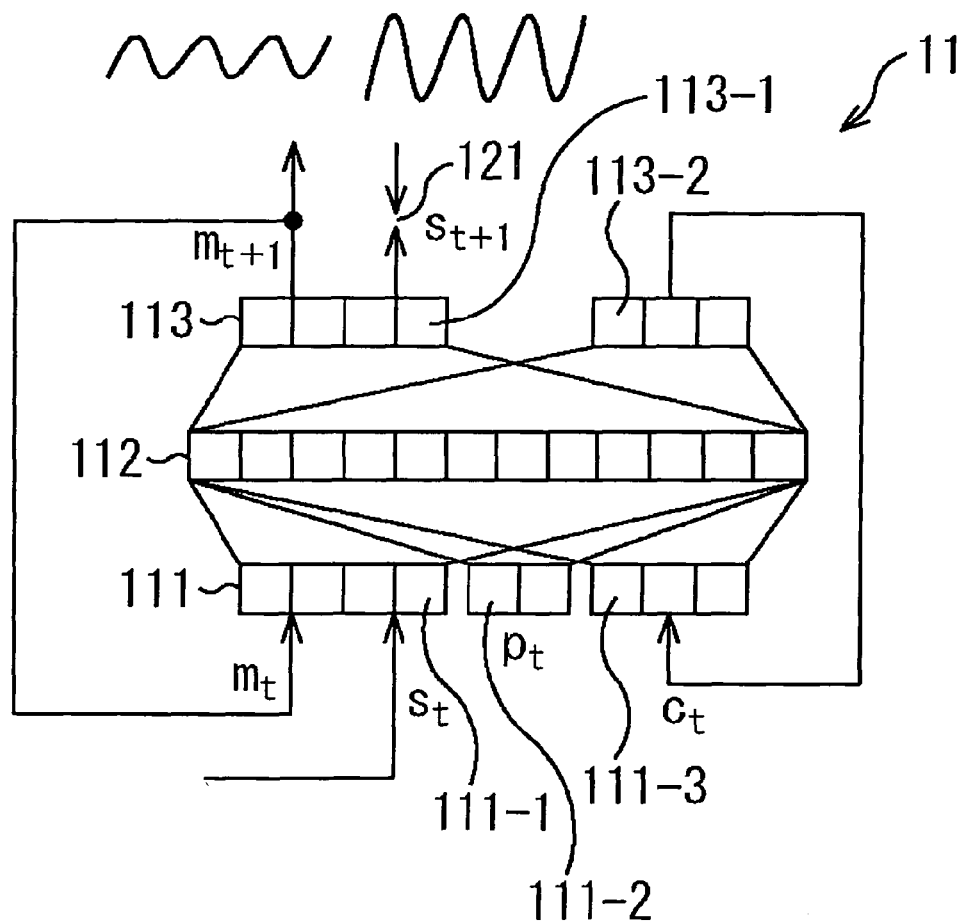
FIG. 14 shows operations, for an autonomous action, of the controller 11 in FIG. 4.

Note that during the reaching action, the motor command output vector m from the neuron 113-1 is feedback-looped to the neuron 111-1 as shown in FIG. 14. The motor command output vector m can autonomously be generated as above.

Figures 15A, 15B, 15C, 15D, 15E, 15F:
FIGS. 15A-15F shows an example of the autonomous action.

In the foregoing, the teaching of the reaching action to the robot 1 and making the reaching action by the robot 1 has been described by way of example. Also, the robot 1 can be taught to continuously roll a ball W on a desk top between the right and left arm units 2 (hand portions 2A) as will be described below with reference to FIG. 15.

In this embodiment, the robot 1 can be directly taught by the user to knock back a ball W, having come to near the left hand, by the left hand and the ball W, having come to near the right hand, by the right hand. Namely, the robot 1 can learn a dynamic physical relation with the ball W and thus continuously roll the ball W.

Figures 16A, 16B, 16C, 16D, 16E, 16F:
FIGS. 16A-16F shows another example of the autonomous action.

Also, the robot 1 can be taught to lift the ball W with both hands as shown in FIG. 16.

Note that for teaching the robot 1 to make two actions, one being the ball rolling action and the other being the ball lifting action, for example, the user should teach the robot 1 for the ball rolling action and then hold the arm units 2 of the robot 1 and guide them to lift the ball W. Thereby, the robot 1 can be taught to lift the ball after rolling it.

That is, even when the robot 1 is taught to the two actions, namely, the ball rolling and lifting actions, the user may not clearly specify any action about which he is going to teach the robot 1. The user can easily teach the robot 1 a plurality of teaching.

Also, the robot 1 can be taught to stack up blocks in predetermined colors according to their colors as shown in FIGS. 17 and 18.

FIG. 17 shows an action of the robot 1 to stack a yellow one, of yellow block Wy, blue block Wb and red block Wr arranged in this order, on the red one of them.

FIG. 18 shows an action of the robot 1 to stack a yellow one, of red block Wr, yellow block Wy and blue block Wb arranged in this order, on the blue one of them.

Note that although the user teaches the robot 1 by holding (touching) the arm unit(s) 2 and guiding it as above, the body part(s) of the robot 1 to be so guided are not limited to the arm unit(s) 2 but may be any other appropriate body part(s) of the robot 1 depending upon an action about which the user is going to teach the robot 1. Also, the teaching may not be made by holding and guiding a body part of the robot 1 but with a word or manual sign (showing a closed hand, showing an open hand or pointing a direction in which the body part is to be moved).

FIG. 18 shows a variant of the teaching of the block stackup action shown in FIG. 17. As shown in FIG. 18, the user held and guided the arm unit 2 of the robot 1 to the location of the yellow block Wy (as in FIGS. 18A and 18B), and the robot 1 grasped the yellow block Wy (as in FIGS. 18C to 18G). Then, while holding the hand of the robot 1, the user pointed the finger to the location of the blue block Wb on which the yellow block Wy was to be stacked (as in FIG. 18H). As a result, the robot 1 could stack the yellow block Wy onto the blue block Wb (as in FIG. 18I).

In the aforementioned embodiment, the controller 11 is formed from the RNN 11. The aforementioned learning and autonomous actions are implemented through operations of the RNN 11. However, the learning and autonomous actions may also be implemented by a device or module constructed as shown in FIG. 20.

As shown, the controller 11 includes a learning unit 201 that learns a predetermined time-series pattern (learning of a trajectory indicated with a solid-line arrow in FIG. 7A). The controller 11 also includes an output unit 202 that outputs a time-series pattern corresponding to the result of learning from the learning unit 201 (to move the hand portion 2A along a trajectory indicated with a broken-line arrow in FIG. 7C, for example). The controller 11 further includes an adjusting unit 203 that is supplied with a time-series pattern obtained from an action of the robot 1, based on the time-series pattern output from the output unit 202, and teaching for the action to adjust the time-series pattern output from the output unit 202 correspondingly to the input time-series pattern (to move the hand portion 2A along a trajectory indicated with a solid-line arrow in FIG. 7C, for example). The learning unit 201 learns the time-series pattern adjusted by the adjusting unit 203, supplied from the output unit 202 (a trajectory indicated with the solid-line arrow in FIG. 7C, for example).

For an autonomous action, the output unit 202 of the controller 11 outputs a time-series pattern (to move the hand portion 2A to the object W in the position B1 as in FIG. 7, for example) corresponding to the result of learning from the learning unit 201 (result of learning of the teaching for the reaching action). The adjusting unit 203 is supplied with a time-series pattern obtained from the action of the robot 1, based on the time-series pattern output from the output unit 202, and teaching for the action to adjust the time-series pattern output from the output unit 202 (change the parameter) correspondingly to the input time-series pattern (to move the hand portion 2A toward the position B2 when the position of the object W is changed to the position B2 during movement of the hand portion 2A, for example). The learning unit 201 learns the time-series pattern adjusted by the adjusting unit 203 and supplied from the output unit 202 (a trajectory indicated with the solid-line arrow in FIG. 7C, for example).

The aforementioned series of operations may be effected by hardware and can also be effected by software. In the latter case, a personal computer 501 as shown in FIG. 21 is used.

Figure 21:
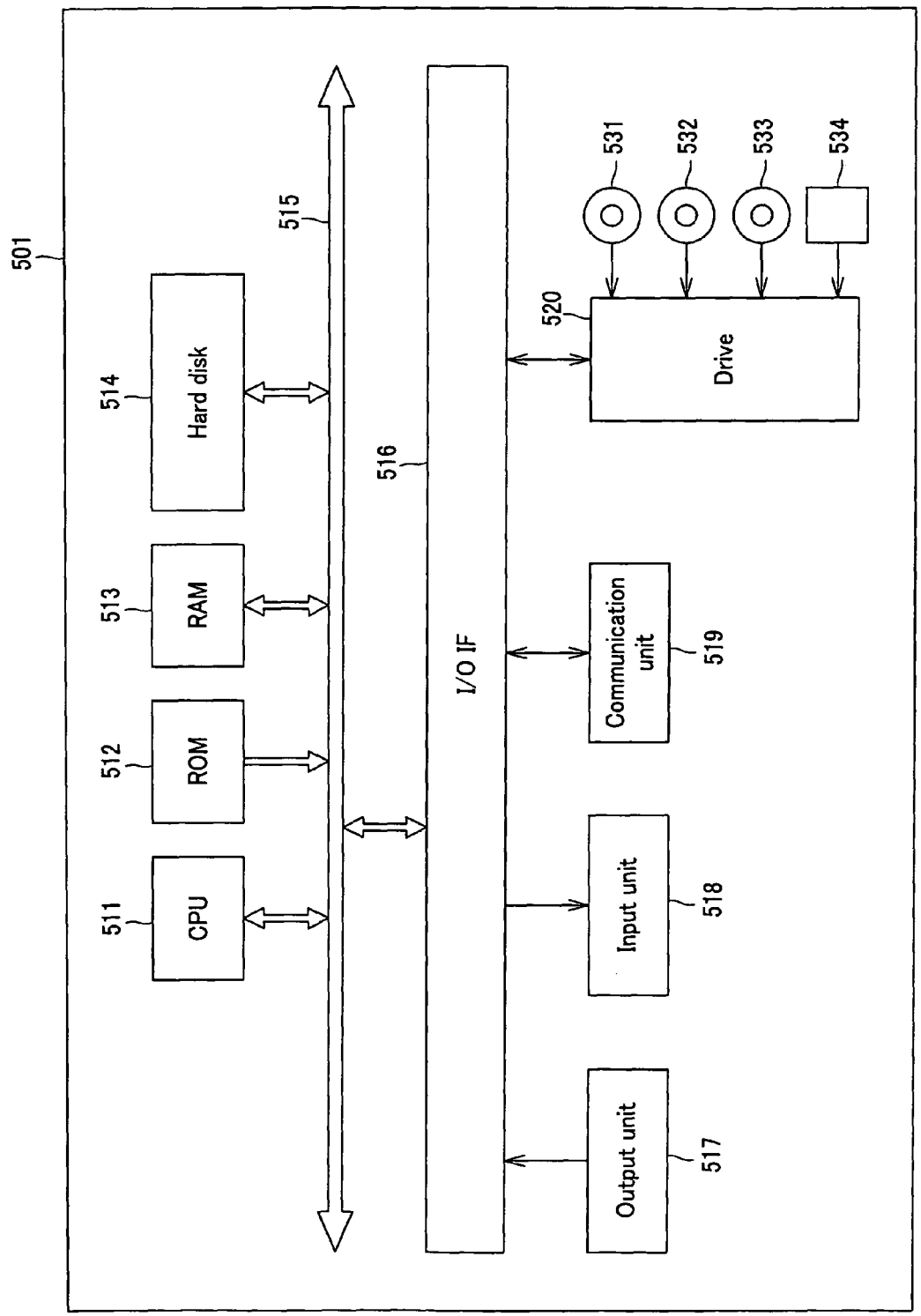
FIG. 21 is also a schematic block diagram of a personal computer, showing an example of the computer configuration.

As shown in FIG. 21, a CPU (central processing unit) 511 effects a variety of operations according to a program stored in a ROM (read-only memory) 512 or a program loaded from a hard disk 514 to a RAM (random-access memory) 513. The RAM 513 appropriately stores data etc. necessary for the CPU 511 to effect various operations.

The CPU 511, ROM 512 and RAM 512 are connected to each other via a bus 515 to which an input/output interface 516 is also connected.

The input/output interface 516 has connected thereto an input unit 518 including a keyboard, mouse and the like, output unit 517 including a display of CRT or LCD type, speaker and the like, and a communication unit 519 including a modem, terminal adapter and the like. The communication unit 519 makes communications over a network.

The input/output interface 516 has also connected thereto a drive 520 in which a magnetic disk 531, optical disk 523, magneto-optical disk 533 or semiconductor memory 534 is appropriately loaded to install a computer program read from such a recording medium into the hard disk 514 as necessary.

To effect a series of operations by a software, a program for the software is installed from a network or recording medium into the personal computer 501.

As shown in FIG. 21, the recording medium may not only be a package media, separate from the personal computer 501 and including the magnetic disk 531 (including a floppy disk), optical disk 532, magneto-optical disk 533 or semiconductor memory 534, each having recorded therein a program for distribution to the user, but also the ROM 512, hard disk 514 or the like having the program recorded therein and pre-assembled in the personal computer 501 for distribution to the user.

Note that those skilled in the art should understand that the steps of stating a program to be recorded to a recording medium of course include steps of operation made time-serially in the order described herein as well as steps of operation not effected time-serially but effected in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a learning means for learning a predetermined time-series pattern;
an output means for outputting a time-series pattern learned by the learning means; and
an adjusting means supplied with a time-series pattern obtained from an action made by an action unit on the basis of a previously learned time-series pattern supplied from the output means and external teaching, for the action to adjust a time-series pattern supplied from the output means correspondingly to an input time-series pattern, the learning means learning the time-series pattern supplied from the output means and adjusted by the adjusting means,
wherein the external teaching is given during a period of time when, given one or more new starting or ending positions, the action to move from the given starting position to the ending position made by the action unit on the basis of a previously learned time-series pattern is made, correspondingly to a user's touch on the action unit fails,
wherein the time-series pattern learned by the learning means is previously learned time-series pattern adjusted by the adjusting means based upon external teaching, and
wherein the action unit incorporates an image capture unit that captures a picture for obtaining a time-series pattern, the image capture unit is installed in a predetermined place of the action unit.

2. The apparatus according to claim 1, being formed from a recurrent type neural network, wherein:
the learning means acquires, as the result of learning the time-series pattern, a weighting factor and parametric bias parameter in the recurrent type neural network;
the output means calculates the parametric bias parameter on the basis of the weighting factor and output a time-series pattern corresponding to the parametric bias parameter resulted from the calculation; and
the adjusting means can be supplied with a time-series pattern obtained from an action made by the action unit on the basis of the time-series pattern supplied from the output means and time-series pattern obtained external teaching for the action to change the parametric bias parameter correspondingly to the input time-series pattern.

3. An information processing method, executed by a processor, comprising the steps of:
learning, utilizing a learning unit, a predetermined time-series pattern;
outputting, utilizing an output unit, a time-series pattern corresponding to the result of learning in the learning step; and
receiving, at a receiving unit, a time-series pattern obtained based on an action made by an action unit on the basis of a previously learned time-series pattern supplied from the outputting step and external teaching, for the action to adjust a time-series pattern supplied from the outputting step correspondingly to an input time-series pattern, in the learning step, there being learned the time-series pattern supplied from the outputting means and adjusted by the adjusting means,
wherein the external teaching is given during a period of time when, given one or more new starting or ending positions the action to move from the given starting position to the ending position made by the action unit on the basis of a previously learned time-series pattern is made, correspondingly to a user's touch on the action unit fails,
wherein the time-series pattern learned in the learning step is previously learned time-series pattern adjusted by the adjusting means based upon external teaching, and
wherein the action unit incorporates an image capture unit that captures a picture for obtaining a time-series pattern, the image capture unit is installed in a predetermined place of the action unit.

4. A non-transitory computer-readable medium encoded with a computer-readable program that when executed on a processor, cause the processor to perform a method, the method comprising the steps of:
learning, utilizing a learning unit, a predetermined time-series pattern;
outputting, utilizing an outputting unit, a time-series pattern corresponding to the result of learning in the learning step; and
receiving, at a receiving unit, a time-series pattern obtained based on an action made by an action unit on the basis of a previously learned time-series pattern supplied from the outputting step and external teaching, for the action to adjust a time-series pattern supplied from the outputting step correspondingly to an input time-series pattern, in the learning step, there being learned the time-series pattern supplied from the outputting step and adjusted by the adjusting means,
wherein the external teaching is given during a period of time when, given one or more new starting or ending positions, the action to move from the given starting position to the ending position made by the action unit on the basis of a previously learned time-series pattern is made, correspondingly to a user's touch on the action unit fails,
wherein the time-series pattern learned in the learning step is previously learned time-series pattern adjusted by the adjusting means based upon external teaching, and
wherein the action unit incorporates an image capture unit that captures a picture for obtaining a time-series pattern, the image capture unit is installed in a predetermined place of the action unit.

5. An information processing apparatus comprising:
a learning means for learning a predetermined time-series pattern;

an output means for outputting a time-series pattern corresponding to the result of learning by the learning means; and an adjusting means supplied with a time-series pattern obtained from an action made by an action unit on the basis of a previously learned time-series pattern supplied from the output means and external teaching, for the action to adjust a time-series pattern supplied from the output means correspondingly to an input time-series pattern, wherein the external teaching is given during a period of time when, given one more new starting or ending positions, the action to move from the given starting position to the ending position made by the action unit on the basis of a previously learned time-series pattern is made, correspondingly to a user's touch on the action unit fails, wherein the time-series pattern learned by the learning means is previously learned time-series pattern adjusted by the adjusting means based upon external teaching, and wherein the action unit incorporates an image capture unit that captures a picture for obtaining a time-series pattern, the image capture unit is installed in a predetermined place of the action unit.

6. The apparatus according to claim 5, being formed from a recurrent type neural network, wherein:

the learning means acquires, as the result of learning the time-series pattern, a weighting factor and parametric bias parameter in the recurrent type neural network;

the output means calculates the parametric bias parameter on the basis of the weighting factor and output a time-series pattern corresponding to the parametric bias parameter resulted from the calculation; and the adjusting means can be supplied with a time-series pattern obtained from an action made by the action unit on the basis of the time-series pattern supplied from the output means and time-series pattern obtained external teaching for the action to change the parametric bias parameter correspondingly to the input time-series pattern.

7. An information processing method, executed by a processor, comprising the steps of:

learning, utilizing a learning unit, a predetermined time-series pattern;

outputting, utilizing an outputting unit, a time-series pattern corresponding to the result of learning in the learning step; and receiving, at a receiving unit, a time-series pattern obtained based on an action made by an action unit on the basis of a previously learned time-series pattern supplied from the outputting step and external teaching, for the action to adjust a time-series pattern supplied from the outputting step correspondingly to an input time-series pattern, wherein the external teaching is given during a period of time when given one or more new starting or ending positions, the action to move from the given starting position to the ending position made by the action unit on the basis of a previously learned time-series pattern is made, correspondingly to a user's touch on the action unit fails, wherein the time-series pattern learned in the learning step is previously learned time-series pattern adjusted by the adjusting means based upon external teaching, and wherein the action unit incorporates an image capture unit that captures a picture for obtaining a time-series pattern, the image capture unit is installed in a predetermined place of the action unit.

8. A non-transitory computer-readable medium encoded with a computer-readable program that when executed on a processor, cause the processor to perform a method, the method comprising the steps of:

learning, utilizing a learning unit, a predetermined time-series pattern;

outputting, utilizing an outputting unit, a time-series pattern corresponding to the result of learning in the learning step; and receiving, at a receiving unit, a time-series pattern obtained based on an action made by an action unit on the basis of a previously learned time-series pattern supplied from the outputting step and external teaching, for the action to adjust a time-series pattern supplied from the outputting step correspondingly to an input time-series pattern, wherein the external teaching is given during a period of time when given one or more new starting or ending positions, the action to move from the given starting position to the ending position made by the action unit on the basis of a previously learned time-series pattern is made, correspondingly to a user's touch on the action unit fails, wherein the time-series pattern learned in the learning step is previously learned time-series pattern adjusted by the adjusting means based upon external teaching, and wherein the action unit incorporates an image capture unit that captures a picture for obtaining a time-series pattern, the image capture unit is installed in a predetermined place of the action unit.

9. An information processing apparatus comprising:

a learning unit for learning a predetermined time-series pattern;

an output unit for outputting a time-series pattern corresponding to the result of learning by the learning unit; and an adjusting unit supplied with a time-series pattern obtained from an action made by an action unit on the basis of a previously learned time-series pattern supplied from the output unit and external teaching, for the action to adjust a time-series pattern supplied from the output unit correspondingly to an input time-series pattern, the learning unit learning the time-series pattern supplied from the output unit and adjusted by the adjusting unit, wherein the external teaching is given during a period of time when, given one or more new starting or ending positions, the action to move from the given starting position to the ending position made by the action unit on the basis of a previously learned time-series pattern is made, correspondingly to a user's touch on the action unit fails, wherein the time-series pattern learned in the learning step is previously learned time-series pattern adjusted by the adjusting means based upon external teaching, and wherein the action unit incorporates an image capture unit that captures a picture for obtaining a time-series pattern, the image capture unit is installed in a predetermined place of the action unit.

10. An information processing apparatus comprising:

a learning unit for learning a predetermined time-series pattern;

an output unit for outputting a time-series pattern corresponding to the result of learning by the learning unit; and an adjusting unit supplied with a time-series pattern obtained from an action made by an action unit on the basis of a previously learned time-series pattern supplied from the output unit and external teaching, for the action to adjust a time-series pattern supplied from the output unit correspondingly to an input time-series pattern, wherein the external teaching is given during a period of time when, given one or more new starting or ending positions, the action to move from the given starting position to the ending position made by the action unit on the basis of a previously learned time-series pattern is made, correspondingly to a user's touch on the action unit fails, wherein the time-series pattern learned by the learning unit is previously learned time-series pattern adjusted by the adjusting unit based upon external teaching, and wherein the action unit incorporates an image capture unit that captures a picture for obtaining a time-series pattern, the image capture unit is installed in a predetermined place of the action unit.

* * * * *